(12) United States Patent
Lutz et al.

(10) Patent No.: US 10,731,039 B2
(45) Date of Patent: Aug. 4, 2020

(54) POWDER COATING AND METHOD FOR PRODUCING A POWDER COATING

(71) Applicant: TIGER COATINGS GMBH & CO. KG, Wels (AT)

(72) Inventors: Christian Lutz, Wels (AT); Carsten Herzhoff, Wels (AT)

(73) Assignee: TIGER COATINGS GMBH & CO. KG, Weis (AT)

( * ) Notice: Subject to any disclaimer, the term of this patent is extended or adjusted under 35 U.S.C. 154(b) by 215 days.

(21) Appl. No.: 15/760,130

(22) PCT Filed: Sep. 16, 2016

(86) PCT No.: PCT/EP2016/071919
§ 371 (c)(1),
(2) Date: Mar. 14, 2018

(87) PCT Pub. No.: WO2017/046296
PCT Pub. Date: Mar. 23, 2017

(65) Prior Publication Data
US 2018/0258293 A1    Sep. 13, 2018

(30) Foreign Application Priority Data

Sep. 18, 2015 (EP) ..................................... 15185834

(51) Int. Cl.
| | | |
|---|---|---|
| *C09D 5/03* | (2006.01) | |
| *C09D 7/62* | (2018.01) | |
| *C09C 1/62* | (2006.01) | |
| *C09C 1/64* | (2006.01) | |
| *C09D 5/36* | (2006.01) | |
| *C09C 1/00* | (2006.01) | |
| *C09D 7/63* | (2018.01) | |
| *C08K 9/10* | (2006.01) | |
| *C08K 3/013* | (2018.01) | |
| *C08K 5/00* | (2006.01) | |

(52) U.S. Cl.
CPC ............ *C09D 5/032* (2013.01); *C09C 1/0015* (2013.01); *C09C 1/62* (2013.01); *C09C 1/64* (2013.01); *C09D 5/36* (2013.01); *C09D 7/62* (2018.01); *C09D 7/63* (2018.01); *C01P 2004/51* (2013.01); *C08K 3/013* (2018.01); *C08K 5/0041* (2013.01); *C08K 9/10* (2013.01); *C09C 1/644* (2013.01); *C09C 1/646* (2013.01)

(58) Field of Classification Search
CPC . C09D 5/032; C09D 5/36; C09D 7/62; C09D 7/63; C09C 1/0015; C09C 1/62; C09C 1/64; C08K 3/013; C08K 9/10
See application file for complete search history.

(56) References Cited

U.S. PATENT DOCUMENTS 3,939,114 A    2/1976  Camelon et al.

FOREIGN PATENT DOCUMENTS

| | | |
|---|---|---|
| CN | 101311234 | 11/2008 |
| CN | 101341219 | 1/2009 |
| CN | 101432376 | 5/2009 |
| CN | 101955720 | 1/2011 |
| CN | 103756525 | 4/2014 |
| DE | 2457872 | 6/1975 |
| DE | 102007006820 | 8/2008 |
| DE | 102008031901 | 1/2010 |
| DE | 102011055072 | 5/2013 |
| EP | 0176132 | 4/1986 |
| EP | 0459048 | 12/1991 |
| EP | 2896661 | 7/2015 |
| JP | S5026837 | 6/1977 |
| JP | S5276341 | 6/1977 |
| JP | S5378235 | 7/1978 |
| JP | S548641 | 1/1979 |
| JP | 2001329226 | 11/2001 |
| JP | 2004353728 | 12/2004 |
| JP | 2015145456 | 8/2015 |
| WO | WO 2005/063897 | 7/2005 |
| WO | WO 2011129445 | 10/2011 |
| WO | WO 2015/107181 | 7/2015 |

OTHER PUBLICATIONS

Machine translation of CN 101311234 (Year: 2008).*
Office Action issued in corresponding Chinese Patent Application No. 201680054002, dated Aug. 2, 2019.
Office Action issued in corresponding Japanese Patent Application No. 2018514373, dated Jul. 9, 2019.
International Search Report and Written Opinion issued in International Application No. PCT/EP2016/071919, dated Nov. 11, 2016.
Pulverbeschichten, [online]. Wikipedia, published Jul. 29, 2015 [Accessed Feb. 21, 2019].
BASF, Color & Effects, Mearlin Exterior Bright Copper 349X, Technical Datasheet, Mar. 2017.
De.wikipedia.org (2019). Dry-Blend. [online] Available at: https://de.wikipedia.org/w/index.php?title=Dry-Blend&oldid=121 [Accessed Feb. 6, 2019].
DIN EN ISO 8130-12:2011-02, Pulverlacke—Teil 12: Bestimmung der Mischbarkeit, Feb. 2011.
Eckart: "Metallic-und Perlglanzeffektpigmente fur Pulverlacke/ Metallic and Pearlescent Effect Pigments for Powder Coatings," (Oct. 2017). Hartenstein, Germany.

(Continued)

*Primary Examiner* — Edward J Cain
(74) *Attorney, Agent, or Firm* — Norton Rose Fulbright US LLP

(57) ABSTRACT

The invention relates to a powder paint comprising at least one base powder paint and at least one effect powder paint having effect pigments, said effect pigments being dispersed in a melt made from transparent effect powder paint. The invention also relates to a method for producing said type of powder paint and to an effect powder coating containing said type of powder paint.

11 Claims, 29 Drawing Sheets

(56) References Cited

OTHER PUBLICATIONS

Eckart: "Metallic-und Perlglanzeffektpigmente fur Pulverlacke/ Metallic and Pearlescent Effect Pigments for Powder Coatings," (March 2013). Hartenstein, Germany.
European Office Communication Issued in Corresponding European Patent Application No. 15185834.7, dated Dec. 3, 2019. (German).
Experimentelle Daten Zur Verwendung V011 Perlglazpigmenten in einem patentgemassen Pulverlack, Seite 70-10 vom Schreiben der Patentinhaberin vom Apr. 7, 2019
Merck, 40650 Iriodin 9307 Star Gold SW, Technical Datasheet, Jan. 2018.
Pcimag.com. (2019) [online] Available at: https://www.pcimag.com/articles/94305-modern-metallics, [Accessed May 2, 2019].

* cited by examiner

POWDER COATING AND METHOD FOR PRODUCING A POWDER COATING

CROSS-REFERENCE TO RELATED APPLICATIONS

This application is a national phase application under 35 U.S.C. § 371 of International Application No. PCT/EP2016/071919 filed Sep. 16, 2016, which claims priority to EP Application No. 15185834.7 filed Sep. 18, 2015; the entire contents of each of the referenced disclosures is specifically incorporated by reference herein without disclaimer.

The present invention relates to a powder coating comprising at least one basic powder coating B and at least one effect powder coating A comprising effect pigments, to the manufacture of such an effect powder coating by means of effect pigment-protecting dispersion of effect pigments in a melt of a transparent powder coating, for example by gentle extrusion, as well as to an effect powder coating as can be provided by the powder coating according to the present invention.

STATE OF THE ART

According to the current state of the art, metallic powder coatings, which are also referred to as effect powder coatings, in particular RAL 9006, RAL 9007, DB coatings or iron mica coatings, are produced using the so-called bonding or dry blending method. In this method, the powder coating present in powder form is weighed with effect pigments and additives in the correct ratio and homogenized in a subsequent mixing process. In particular, effect basic powder coating based on resin, on polyester/Primid®, polyester/epoxy mixtures, on pure epoxy, or on polyurethane resins is used as a powder coating. In particular, pigments based on aluminum flakes, on natural or synthetic mica, or on glass can be used as an effect factor. According to the respective requirements, these pigments are single- or multi-coated, thereby rendering them resistant to weathering and/or chemicals. A non-exhaustive overview is given in the following:
  aluminum pigments
  mica pigments (pearlescent or interference pigments)
  metallic-effect pigments
  luminescent pigments
  stainless steel pigments
  gold bronze pigments
  copper pigments
  glass flakes
  hollow glass spheres The mixing process can be performed as a simple mixing process in a mixer with low peripheral speed and short residence time, wherein binding agents, additives etc. and the metallic pigment particles are dry-blended. The disadvantage here is that such dry blends, among other factors due to the difference in specific weights and electrostatic charging behavior, result in a segregation of metallic pigment and binding agent during the powder coating process. Thus, the recyclability of such a powder coating comprising metallic pigments is no longer given for powder coatings produced according to this method.

Alternatively, in the so-called bonding method, a physical bonding of the metallic pigment particles to the powder coating particles can be achieved by heating a mixture of powder coating and metallic pigment until the glass transition temperature of the powder coating is achieved. The bonding method thus effects an adhesion of the metallic pigment particles to the surface of the powder coating particles by introducing energy, e. g. by means of external heat sources or high shearing forces, and a resulting heating of the powder coating to the glass transition point or higher.

Another manufacturing process, in particular for obtaining so-called hammer-effect coatings for indoor use, is conducted by mixing powder coating raw materials, in particular resins, curing agents, pigments, additives, and bulking agents, with dust-free or dedusted aluminum effect pigments, subsequent extrusion, cold rolling, crushing and grinding to finally obtain a powder coating. In general, this method is used only for producing coatings with hammer effect and rough structures; the required chemical resistance, also to weather influences such as with facades and highly weather-resistant systems, cannot be guaranteed with only one layer. Such effects are thus only employed in decorative interior applications.

As explained, for example, in CN 101955720A, a mixture of raw materials for obtaining a colorless powder coating is first weighed in order to achieve a homogenization of powder coating and aluminum effect pigments. In addition, a light-shielding powder coating comprising coarse and fine aluminum pigment particles is prepared, which all together are mixed for 5-10 minutes and then extruded. In this case, the pigment is already contained in the premix and is subjected to the entire extrusion process. Subsequently, the extrudate is rolled flat, cooled, crushed, and finally ground.

CN 103756525A describes the production of thermosetting powder coatings. In this method, the raw materials consisting of polyester resins, curing agents, additives and mica pigment particles, are mixed in a high-speed stainless-steel mixer and subsequently extruded in a twin-screw extruder. Subsequently, the product thus obtained is cold-rolled, crushed and ground. Also in this case, the pigment has already been weighed into the premix and is introduced at the beginning of the extrusion process.

EP 2896661A1 relates to a powder coating in particulate and cured form comprising effect pigments as well as to a method for preparing a powder coating comprising effect pigments. In this method, a film-forming, homogeneous, thermoplastic coating mass is produced from the starting materials, in particular comprising binding agents, additives, coloring agents and/or bulking agents, by means of an extruder, and the resulting coating mass is ground after leaving the extruder, wherein the effect pigments are added in an end region of the extruder and dispersed in the viscous coating mass. The effect pigments are thereby wetted and coated with the film-forming coating mass, wherein at least 50%, especially at least 75%, and preferably at least 90% of the surface of the effect pigment particles are wetted with the coating mass. The composition of the final powder coating is identical to the composition used for coating the effect pigment particles.

DE 102007006820A1 relates to metallic-effect pigments having a homogeneous synthetic resin layer, wherein said synthetic resin coating comprises polyacrylate and/or polymethacrylate as well as organofunctional silane. The synthetic resin layer is applied onto the metallic-effect pigment particles by means of in situ polymerization to form a layer.

WO 2005/063897A2 discloses chemically and mechanically resistant metallic-effect pigments coated with oligomeric and/or polymeric binding agents which can be cross-linked chemically and/or under the influence of, e. g., UV or IR radiation. In this manner, the metallic-effect pigments can be embedded in a polymeric film. After the coating of the metallic pigments, the binding agents are still curable or polymerizable, due to which said metallic pigments are used in powder coatings. During the coating process or the evaporation of the solvent, the binding agents can be slightly grafted, but they will not cure. The metallic pigment may be coated with the same binding agent system, in which it will be embedded and processed later on—for example in a powder coating. The metallic-effect pigments are produced by dispersing the metallic pigment particles in a solution or dispersion of an oligomeric and/or polymeric binding agent in an organic solvent and subsequent spraying or by spraying a solution or dispersion of an oligomeric and/or polymeric binding agent in an organic solvent onto metallic pigment particles being swirled a gas stream, followed by drying the metallic pigment particles that are coated with said binding agent in a moving gas stream.

Requirements for the Invention

Powder coating effects, e. g. for coating facades or windows, are supposed to provide a distinctive effect (a so-called sparkling effect), which is particularly pronounced in dark basic shades. Due to the high contrast between lighter, brilliant effect pigments and the dark basic color, the slightest differences in effect concentration are easily discernible, especially in the finished object, in particular when a plurality of coated components are mounted directly adjacent to one another and aligned end to end. In the case of larger components, undesirable clouds or bandings have often shown (due to locally increased pigment concentration) in prior art coatings. In addition, coatings performed on different coating systems or with different system settings and part geometries could sometimes yield different coating results and shade/effect formations. These variations in shade are not desirable and will most likely be complained about by contractors or architects, even though they merely represent an optical defect and do not impair the protective effect of the powder coating.

Moreover, the proportion of recycling powder is very important in effect powder coatings. During the coating process, the powder which does not adhere to the object will be suction-filtered and passed on to a cyclone. In said cyclone, the fine fraction is separated from the rest and suctioned off by means of rotation and gravity forces. The rest is then collected in a metering system and/or is recycled to the fresh powder in defined amounts and thus re-introduced into the coating process. With effect powder coatings prepared by the dry blending method there is a risk that the fine metallic-effect pigment particles will be separated and suctioned off through the cyclone. This is reflected in the so-called effect drift, which renders the shade of the effect powder coating less and less metallic over time. Thus, the proportion of powder to be recycled is very limited. In powders prepared by the bonding method, this effect drift is only slightly noticeable as the pigment is virtually "glued" to the powder granule by the process and will thus not be separated in the cyclone air stream. Nevertheless, it is common to use a proportion of not more than about 30% of recycling powder during the application.

Problem Underlying the Invention:

The problem underlying the present invention is the manufacture of unique and brilliant effect powder coatings, whose appearance or effect characteristics are only insignificantly influenced by gun type, equipment setting, proportion of recycling powder and part geometry. These absolutely process-safe and pronounced metallic effects have a special depth effect and are suitable for use in highly weather-resistant systems. The effects are absolutely comparable to those of wet paints. Furthermore, the present invention relates to such a powder coating containing effect pigments prepared according to the present invention in a milled premix.

Surprisingly, it has now been found that the combination of a milled premix, which comprises effect pigment particles dispersed in a melt of at least one transparent powder coating, and a powder coating, which forms the basis of the effect coating, keeps the shear forces acting on the effect pigment at such a low level that most of the effect pigments will not be subjected to any substantial reduction in particle size. Such effect powder coatings are characterized by:

high process stability with respect to a wide variety of application parameters pronounced metallic effects, in particular characterized by a strong depth effect, a brilliant effect and especially by featuring said effects irrespectively of the viewing angle. Moreover, substrates coated with the metallic powder coatings according to the present invention also show significantly less color variations within a defined area. These properties are still impossible to realize with the metallic powder coatings according to the prior art.

improved recyclability of the powder coating due to an increased proportion of recycling powder that can be re-used for coating, thus also reducing the proportion of waste to be discarded.

SUMMARY OF THE INVENTION

The above-mentioned problem underlying the present invention is solved by providing a powder coating comprising at least one basic powder coating B and at least one effect powder coating A comprising effect pigments, wherein the effect pigment particles present in the effect powder coating A are, at least partially, coated with a transparent curable powder coating matrix. The effect pigment particles can be dispersed in a melt of transparent and usually colorless effect powder coating. As a transparent and usually colorless powder coating, a powder coating composition is generally used which in most cases exclusively consists of resins/curing agents and required additives (e. g. for film degassing). The cured powder coating film has a high transparency (translucency). According to the present invention, a transparent powder coating is preferably used which, in case of a layer thickness of 15 µm of the cured film, still has sufficient transparency to keep visible the underlying coating layers or substrates.

As is well known in the art, the occurrence of excessive shear stress in the dispersing (mixing or extruding) process of effect pigment particles comprised in a powder coating thus produced usually means that the effect pigment particles are damaged and are no longer capable of achieving the desired effect at all or only in a significantly reduced manner. There are a number of additional disadvantages, such as the aforementioned lack of recyclability. Surprisingly, it has now been found that the introduction of effect pigment particles into molten, transparent powder coatings performed with low shearing forces allows for a very good dispersion/homogenization of the effect pigment particles in the polymer matrix of the transparent powder coating, while at the same time obtaining optical properties comparable to those obtained with effect pigments that are superficially bonded to powder coating granules by means of bonding or dry blending (dry mixing) processes. Particularly surprising in this context was the realization that a powder coating containing at least two powder coatings A and B, wherein powder coating A contains effect pigment particles which are at least partially coated by a transparent powder coating matrix and powder coating B is a colored basic powder coating that is not transparent in the sense of the present invention, in a manner contrary to all expectations yields prominent effect properties, such as a uniform color and effect appearance of coated substrates (no so-called cloud formation) and, above all, an effect image that is substantially independent of the respective viewing angle. This independence of the viewing angle can be determined not only visually, but also by measurement. The samples were analyzed using the colorimeter "BYKmac" by BYK, Germany. Relevant in this context are the values SI (sparkle intensity) and SA (sparkle area), which are determined at three different measuring angles. Measurements were performed on a coating prepared with bonded powder coating and on a coating prepared with the powder coating according to the present invention. Despite a similar effect image, there is a significant difference, as can be seen in Table 1.

The measurement values show that the sparkle intensity measured on coatings produced with the powder coating according to the present invention is very high at all three measurement angles. There is only a slight difference between the measured angles (max. 30% below the maximum value). With bonded powder coating, the sparkle intensity is high only at one angle and significantly lower at the other two angles. In this case, the lowest value is up to 90% below the highest value measured on the same sheet, at a different measurement angle.

This effect is also discernible visually, as is shown in FIGS. 1 through 9. Here, one metal sheet coated with bonded effect coating (left side) and another metal sheet coated with the powder coating according to the present invention (right side) were placed adjacent to one another in a plane-parallel manner and photographed at different angles in a light box.

According to the inventors' opinion—without being bound to a specific theory—the effect observed and also measured can be explained by the fact that channels consisting of transparent powder coating are formed in the coating layer obtained with the powder coating according to the present invention. In this manner, not only the pigment particles located at the surface of the powder coating, but also the particles located deep inside the powder coating can become visible to the observer. This effect creates, on the one hand, the above-mentioned independence of the viewing angle, and on the other hand a visually perceptible 3D or depth effect of the powder coating according to the present invention. The prior art powder coatings prepared by means of dry blending, bonding or by introducing effect pigments into a powder coating melt during the extrusion process, whether initially or via a side feeder, do not exhibit this effect.

Photomicrographs of cross-section polishes of powder coating layers prepared with the powder coating according to the present invention substantiate the above theory of channel formation by a transparent powder coating matrix. As can be seen in the Examples, the application of the powder coating according to the present invention to a suitable substrate provides an effect powder coating, wherein the channel formed from the transparent matrix between the effect pigment particles and the surface of the coating has a depth of at least 5 µm, preferably of at least 10 µm and particularly preferably of at least 20 µm. As is apparent from a comparison of FIGS. 10 to 13 with FIGS. 14 to 16, only the effect pigment particles embedded directly at the surface of the coating matrix are visible in the prior art coatings (FIGS. 14 to 16), while in the coatings obtained with the powder coating according to the present invention (FIGS. 10 to 13) all the effect pigment particles embedded in the transparent powder coating matrix are visible, even if they are located deep below the surface of the powder coating according to the present invention (images of such cross-section polishes are shown in FIGS. 10 to 16, as already explained). The darker areas without any visible particles (such as bulking agents or color pigments) consist of the above-mentioned transparent powder coating matrix. These channels extend up to 60 µm deep into the powder coating layer and render visible even those pigment particles that are embedded deep inside the powder coating layer (in these photographs, the effect pigment particles appear as bright areas due to illumination).

In the powder coating according to the present invention, the shear forces acting on the effect pigment particles in effect powder coating A during production are so low that most of the effect pigment particles are not subjected to a substantial reduction in particle size. From a technical point of view, this can be achieved by melting a transparent powder coating, for example in a heated stirred reactor, and stirring at least one effect pigment into the melt, wherein the effect powder coating A, which is obtained by cooling and subsequent grinding, is then blended with an opaque, preferably colored basic powder coating B. Other technical embodiments are also conceivable within the scope of the present invention. In a preferred embodiment, at least one effect pigment is added to a melt of transparent powder coating through at least one side feeder during an extrusion process, wherein the effect powder coating A, which is obtained from said powder coating melt by means of cooling and subsequent grinding, is subsequently mixed with a basic powder coating B. The term "side feeder" implies the addition of a substance (according to the prior art usually an additive or effect pigment, see for example information material provided by the extruder manufacturer Leistritz Extrusionstechnik GmbH (Germany) "Master_V_07_GB/ 17.09.13 Masterbatch)) at a position in the extruder process section other than the initial section of the extruder (premix feeder in barrel 1). Through the side feeder, the effect pigment is forcibly conveyed laterally into the extruder and incorporated into the melt in a certain proportion to the transparent powder coating premix. Due to the arrangement of the side feeder along the process section and the implemented screw configuration it is possible to influence the shear force acting on the pigment particles in the extruder. A low shear force acting within the extruder results in a minimal damage to the effect pigment particles. The use of screw elements which only serve the purpose of mixing or conveying the extruder melt allows for a reduction of shear forces down to a level intended according to the present invention, while at the same time providing a sufficient homogenization/dispersion. Conducting the addition in the rear part, preferably in the last third of the process section (for example in the penultimate housing) of the extruder through a side feeder has proven to be particularly advantageous. Starting from the point of addition of the pigment, the shear force is kept as low as possible by means of special screw configurations, for example the exclusive use of conveying elements, in order to cause only minimal damage to (or destruction of) the one or more pigments.

As already mentioned, for the powder coating according to the present invention a transparent effect powder coating A can be prepared by adding at least one effect pigment through at least one side feeder into the melt of a subsequently transparently curing powder coating during an extrusion process and the grinding of the cooled melt, wherein the effect powder coating A is then mixed with at least one further powder coating B, the so-called basic powder coating. Also possible is the joint grinding of extrudate chips of the effect powder coating A according to the present invention together with extrudate chips of another powder coating B in a joint grinding process. The basic powder coating B can be a single-colored powder coating that contains no effect pigments or a powder coating that contains effect pigments and has been prepared by means of dry blending, bonding or extrusion.

As already mentioned above, the effect powder coating A can be prepared in an extruder by adding effect pigment to a transparent powder coating melt via a side feeder. The side feeder itself is arranged in the last third of the process section. Downstream from the point of addition through the side feeder, only low shear forces are exerted by the extruder shaft. Subsequently to the extrusion process, the effect powder coating is cold-rolled, crushed and ground. The powder coating according to the present invention can then be produced by preparing and weighing raw materials, including the transparent effect powder coating A and the basic powder coating B, followed by premixing, extrusion or mixing, cold-rolling, crushing and grinding. The powder coating according to the present invention can then be additionally refined with effect pigment in a further process step, which can in particular be performed by means of a bonding method.

In a preferred embodiment of the present invention, the powder coating according to the present invention comprises the effect powder coating A in admixture with the basic powder coating B in a mass ratio of 1 to 50% of effect powder coating A and 50 to 99% of basic powder coating B, particularly preferably 5 to 30% of effect powder coating A and 70 to 95% of basic powder coating B. The powder coating according to the present invention can be prepared by means of a so-called dry blending or bonding method. Within the scope of the present invention, it is also possible to mix the effect powder coating A powder with the basic powder coating B during the melt phase.

Within the scope of the present invention, basically any extruder type available on the market, such as a single- or multi-screw extruder, can be used, provided it has a side feeder. The parameters to be adjusted, such as screw configurations, torque and throughput, can be selected in a flexible manner depending on the powder coating system employed and the powder coating properties to be adjusted, with the proviso that the shear forces acting downstream from the addition point of the effect pigment particles through the side feeder be kept correspondingly low. With respect to the commercially available extruder types tested, it has proven advantageous to arrange the side feeder for the addition of effect pigments in the rear third of the extruder. For reasons of clarity it should be noted that it is, of course, also possible to feed substances other than effect pigments to the powder coating (e. g. additives) via the one or more side feeders.

Other embodiments, which also enable the introduction into the melt phase without significant shear forces, are of course also conceivable in the sense of the present invention.

The method of preparing powder coatings according to the present invention has proven particularly advantageous for the substitution of prior art powder coatings which are classified as category C according to OFI (Austrian Research Institute for Chemistry and Technology) instruction sheet No. 44. In particular, these are powder coatings exhibiting a very distinctly visible sparkle effect. Notably, such an effect can be achieved by mixing aluminum effect pigments having a D50 of ≥35 μm in the form of so-called silver dollars with a dark basic color. Said silver dollar pigments are made of a special aluminum grit and milled according to the respective size classification. In this manner, pigments are obtained that are characterized by their round to oval shape and a smooth surface. These pigments generally have a very high sparkling degree, i. e. the pigment exhibits a low scattering, but a strong reflection of light. The higher the contrast between the effect pigments (light, silver) and the basic color, the more difficult these effect coatings are in terms of manufacturing and handling by the end user.

When used for preparing a coating, the powder coatings according to the present invention behave similarly to single-colored powder coatings. Phenomena common in large components, such as clouds or banding, will not occur, nor will the typical brightening of edges in different profiles and sizes, which is caused by an accumulation of effect pigments at the edges. This constitutes a marked improvement over the prior art effect powder coatings.

Specific substrates to be coated with the powder coatings according to the present invention are, in particular, pretreated and/or purified/degreased aluminum alloys or steel and its alloys.

Irrespectively of their chemical composition, the powder coatings according to the present invention are characterized in that the one or more effect pigments have been added to the melt phase without any significant damage to the pigment particles due to shear forces. For a more detailed description, however, typical powder coating systems are described here. Further information can be found, for example, in Powder Coatings—Chemistry and Technology, $3^{rd}$ edition, Emmanouil Spyrou.

Powder Coatings:

Potential binding agents for use in the powder coatings according to the present invention include saturated and unsaturated systems. The latter may be cross-linked, inter alia radically by UV irradiation and/or by means of thermal initiators such as peroxides. In terms of quantity, the former are currently dominant in use. Among these binding agents, saturated polyesters play the most significant role. By way of example, carboxyl-functional polyester resins which have a functionality of 2 or higher are mentioned here. These can be cross-linked with organic compounds that are capable of reacting with the carboxyl groups of the polyester to produce a covalent bond and can optionally be mixed with conventional pigments, bulking agents and additives.

Since the 1970's, powder coatings based on carboxyl-functional polyester resins and the polyfunctional epoxy compound triglycidyl isocyanurate (=TGIC) have been recognized as the industry standard for the production of weather-resistant coatings for facade construction, automotive accessories, and general industrial applications.

Among others, possible alternatives to TGIC as curing agents for carboxyl-functional polyester resins are currently represented by β-hydroxyalkylamides such as PrimidR XL-552 (=bis[N,N'-di(β-hydroxyethyl)]adipamide) or PrimidR QM-1260 (=bis[N,N'-di-(β-hydroxypropyl)]adipamide), both available from EMS Chemie, Switzerland. A special feature of these curing agents is, according to current knowledge, their toxicological harmlessness.

Further possible alternatives to TGIC as curing agents for carboxyl-functional polyester resins are, for example, the glycidyl esters of aromatic or cycloaliphatic dicarboxylic acids; a suitable commercially available curing agent with an analogous chemical structure is, e. g., AralditR PT 910 (terephthalic acid triglycidyl ester/trimellitic acid triglycidyl ester, about 75:25) available from CIBA Spezialitatenchemie GmbH, Germany. The presence of the trifunctional trimellitic acid ester in Aralditr PT 910 is to be considered as advantageous in comparison with pure diglycidyl esters with respect to the cross-linking density of baked coatings.

All the above-mentioned products are increasingly important in the formulation of powder coatings made from carboxyl-functional polyester resins, whereas TGIC is still able to prevail in numerous markets. Polyester resins for preparing weather-resistant powder coatings, which are cured by means of polyepoxides and/or β-hydroxyalkylamides, generally have an acid number in the range of 15 to 70 mg KOH/g polyester and a hydroxyl number of □ 10 mg KOH/g polyester. They essentially consist of units of aromatic dicarboxylic acids, such as terephthalic acid and isophthalic acid, in addition to which minor amounts of aliphatic and/or cycloaliphatic dicarboxylic acids, such as adipic acid and/or cyclohexanedicarboxylic acid, are optionally used, and of aliphatic diols, particularly preferably branched, such as neopentyl glycol, in addition to minor amounts of linear and/or cycloaliphatic diols. The co-use of hydroxycarboxylic acids or functional derivatives thereof, such as their inner esters (=lactones), is also possible. Also known is the modification of such resins by the use of di- and trimeric fatty acids. Besides that, smaller amounts of tri- or higher functional and optionally monofunctional compounds may also be employed.

Other powder coatings known to the person skilled in the art, such as epoxy, hybrid, urethane and acrylate coatings, are mentioned here by way of example as further embodiments of the effect powder coatings according to the present invention.

Effect Pigments for Powder Coatings:

As effect pigments according to the present invention, mainly two types of pigments are used, namely aluminum pigments and mica pigments. Brass and copper pigments can also be used.

Effect pigments are subdivided into metallic-effect pigments and special-effect pigments.

Metallic-effect pigments are based on platelets made of metal, especially aluminum. Light is reflected by the metallic surface, which is perceived by the observer as a metallic effect.

Important metallic-effect pigments are aluminum, brass and copper platelets.

Pearlescent pigments and interference pigments are summarized under the term special-effect pigments. Pearlescent pigments are effect pigments consisting of transparent platelets having a high refractive index. They produce a pearl-like effect by multiple reflection. Interference pigments are effect pigments whose coloring effect is based entirely or predominantly on interference. Interference pigments can be based on transparent or non-transparent platelets. Most commonly used in the industry are mica pigments coated with metal oxide, which are classified as pearlescent or interference pigments according to type and thickness of coating. The most important interference pigments are platelet-shaped titanium dioxide, platelet-shaped organic pigments, metal oxide mica pigments, aluminum oxide flakes, Ca/Al borosilicate flakes, silica flakes, metal flakes coated with metal oxide or multilayer pigments. Many of these pigments are additionally coated with metal oxides (e. g. titanium dioxide). The color effect can be influenced by the thickness of the oxide coating. Exemplary commercial names are Iriodin®, Miraval® or Colorstream®.

Pigments based on natural mica are generally produced from naturally occurring muscovite mica by means of grinding, fractionating, cleaning and re-coating, drying and calcination.

The effect of the pigments is based on the principle of regular reflection in the case of metallic-effect pigments and on regular reflection and interference in the case of pearlescent pigments.

All effect pigments have in common that their effect is highly dependent on the viewing angle. In visual comparisons, this is simulated by tilting the viewed sample. A color measurement is thus only reasonable with multi-angle measuring devices.

In a preferred embodiment of the present invention it is provided that the average diameter of the effect pigment particles dispersed in the powder coating according to the present invention amounts to at least 90% of the average diameter of the original effect pigment particles. Depending on the type, the effect pigments (usually present in the form of pigment platelets) usually have a diameter of about 3 to 100 μm while the thickness of each plate is less than 1 μm. The platelets may consist of one or more layers. The carrier material can be crystalline (e. g. mica) or amorphous (glass or silica platelets). In order to achieve a good effect image, the particles must have the highest possible surface smoothness and are supposed to align in the respective application.

Metallic-effect pigments are further subdivided into leafing or non-leafing pigments.

As a result of special surface treatments, leafing pigments orient themselves to the surface in the cured film, thereby generating a strong metallic sheen. This effect is not scratch- or smear-proof, however, due to which in most cases an overcoat with a protective clear coating is required.

Non-leafing pigments will distribute evenly in the film matrix upon application, wherein only a portion of the pigments will be oriented to the surface, which constitutes protection against abrasion and chemical attacks. Their effect, however, is less brilliant and metallic than the effect obtained with leafing pigments.

DESCRIPTION OF THE DRAWINGS

The present invention will be explained in greater detail by the following Examples and Figures, without being limited thereto, however.

EXAMPLES

The present invention will now be described in greater detail in the following Examples, without being limited thereto, however.

The powder coating according to the present invention can, for example, consist of two components, wherein one component is the transparent effect powder coating A and the other component is an opaque colored basic powder coating B.

Example 1

A transparent and colorless powder coating was prepared from 900 parts of Crylcoat® 4642-3 or an equivalent polyester, 47 parts of Primid® XL-552, 5 parts of Richfos® 626, 3 parts of benzoin, 5 parts of Worlee® Add 902, 5 parts of Licowax C Micropowder PM and 2 parts of Tinuvin®. By means of gravimetric feeding, this premix is metered into a twin-screw extruder (e. g. ZSK 27), molten with a screw configuration that is suitable for powder coating production and then dispersed. Such configurations are known to the person skilled in the art. In the last third of the process section of the extruder, 5 parts of aluminum powder PCU 5000 are added by means of a twin-shaft side feeder and gravimetric feeding. The screw configuration downstream from the side feeder is exemplarily shown in FIG. 17. The temperatures inside the extruder are preferably kept at less than 120° C. Next, the liquid extrudate is cold-rolled and crushed in an impact pin mill in order to obtain ground powder coating (D50 less than 80 μm).

The size of the pigments (D50 or mean value) depends on the desired effect and can vary between 3 μm and 130 μm, preferably between 35 μm and 90 μm. The weight proportion of the effect pigments in relation to the total amount present in the transparent master batch can amount to between 1% and 40%, in particular between 2% and 10% by weight.

The opaque, colored basic powder coating B is prepared in the same manner as described above and, in addition to the above raw materials, also contains color pigments and bulking agents, but no metallic/effect pigments.

The following mixture may be considered as an exemplary formulation for the basic powder coating B: 680 parts of CRYLCOAT® 4655-2, 36 parts of Primid® XL-552, 5 parts of Worlee® Add 902, 8 parts of Lanco Wax TF 1890, 18 parts of Powder Add 9083, 2 parts of Pigment Red 101, 10 parts of Pigment Brown 24, 7 parts of Pigment Black 7, 24 parts of titanium TS-6200 and 210 parts of Portaryte B 15.

Subsequently, the two milled components (effect powder coating A and colored, opaque basic powder coating B) were mixed in a ratio of 20 to 80 by means of dry blending. The mixing is conducted in either a dry blend mixer or a bonding mixer.

Figure 17:
FIG. 17: Extruder screw with mixing elements

FIG. 17 shows an extruder screw which is fitted with mixing elements downstream from the point of addition via side feeder.

The pigment platelets in the powder coating according to the present invention were only slightly sheared, bent or cut, so that their original effect (light reflection and sparkle effect) was maintained. In this manner it is, e. g., possible to determine the influence of the time of addition and the employed screw configuration based on micrographs of the extruder cooled melt (transparent powder coating melt containing dispersed metallic pigments).

The micrographs of FIGS. 2 to 6 show the effects of various dispersion processes with high and low shear forces. For this purpose, aluminum pigments having a D50 of about 55 μm were introduced by means of bonding, dry blending or extrusion into a dark powder coating (for better visual representation).

Figure 18:
FIG. 18: Bonded pigment, 200× magnification; pigment slightly damaged (owing to shear forces acting in the bonding mixer)

FIG. 18 shows an incident light microscope image of a cured powder coating film at 200× magnification, wherein the pigment has been introduced into the powder coating according to the present invention by means of bonding; due to the low shear forces acting in the bonding mixer, the pigment is only slightly damaged.

Figure 19:
FIG. 19: Aluminum pigment, introduced into the extrusion process, addition directly with premix; large portion of pigment particles has been destroyed

FIG. 19 shows, in comparison, an incident light microscope image of a cured powder coating film, also at 200× magnification, wherein the pigment has been introduced into the powder coating by means of extrusion; the pigment has been fed to the extruder directly with the premix; a large portion of the pigment was damaged (hammer effect).

Figure 1:
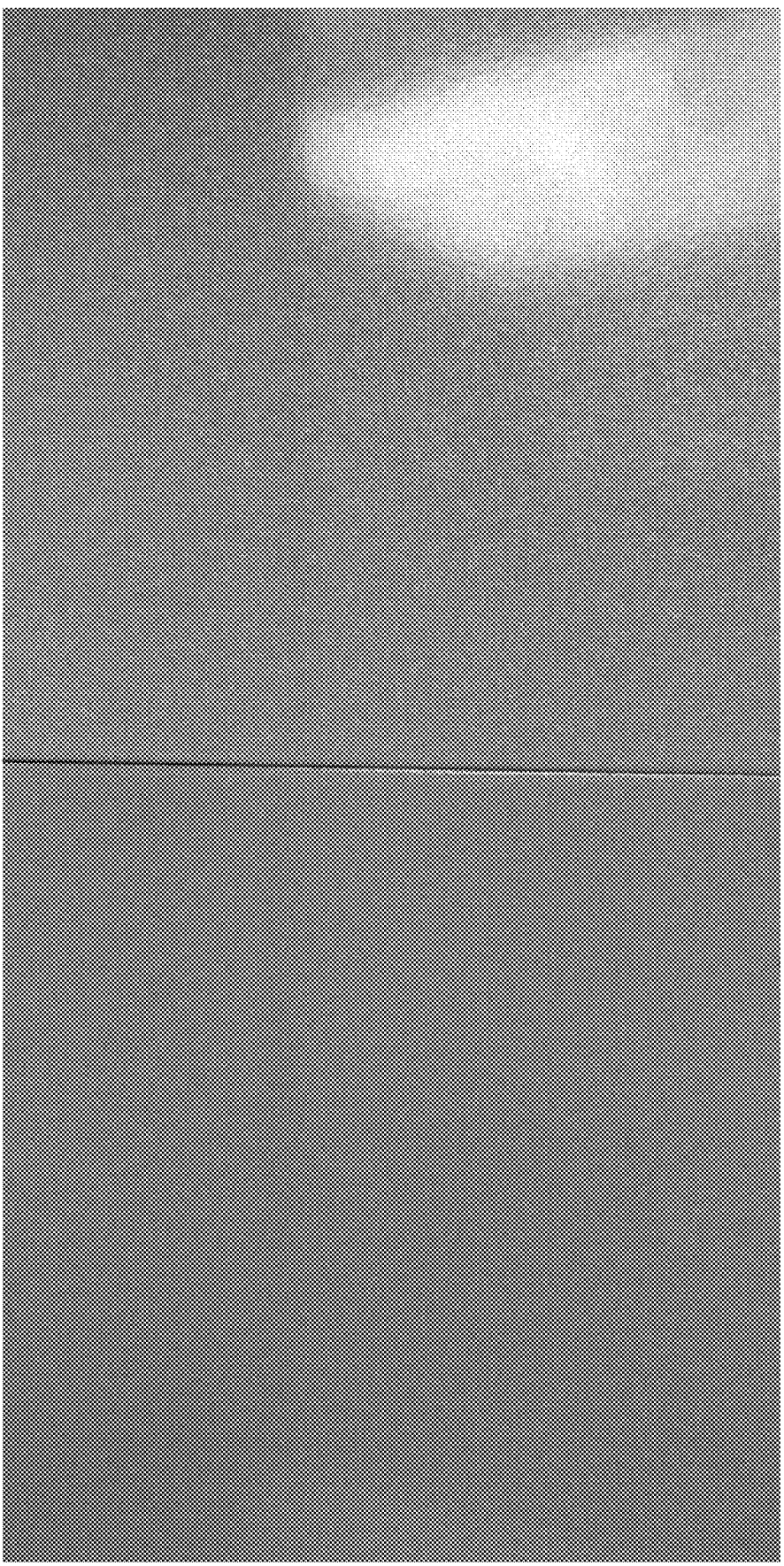
FIG. 1: Effect color approx. RAL 9007, glossy, inclination angle approx. 0°
Figure 2:
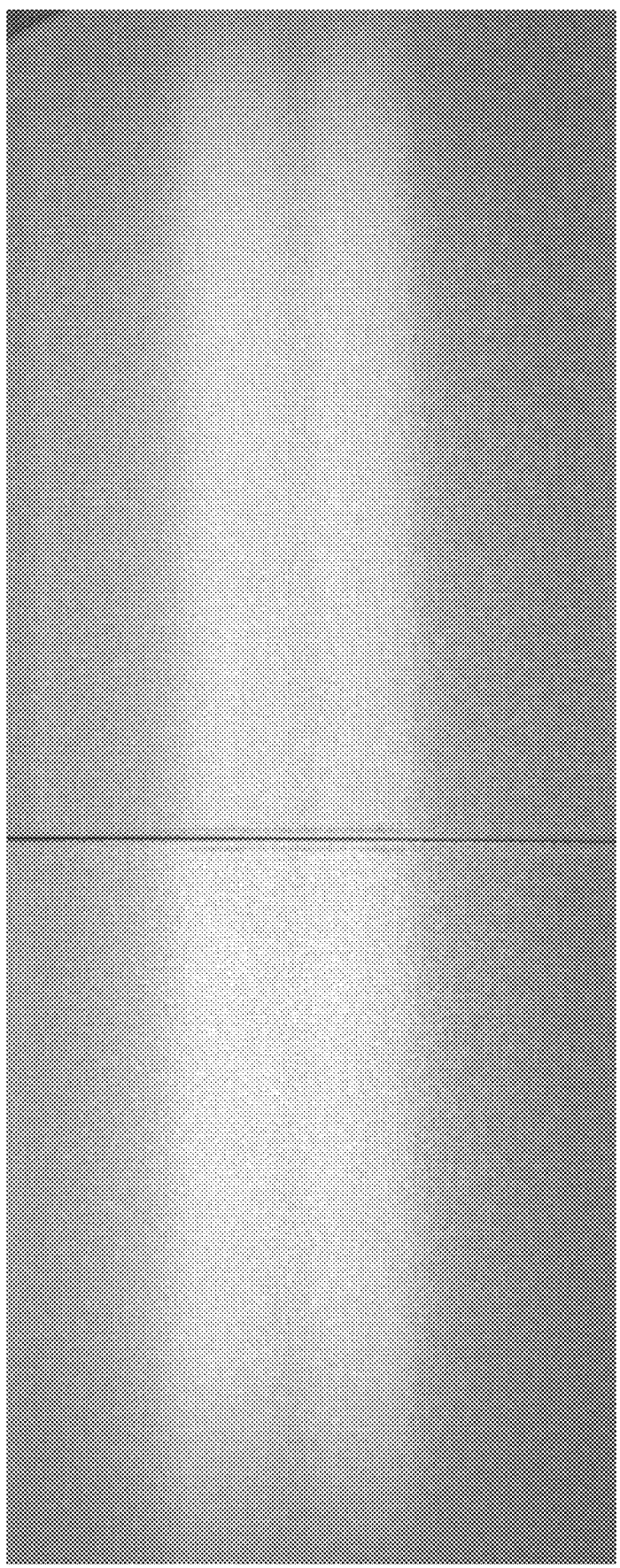
FIG. 2: Effect color approx. RAL 9007, glossy, inclination angle approx. 45°
Figure 3:
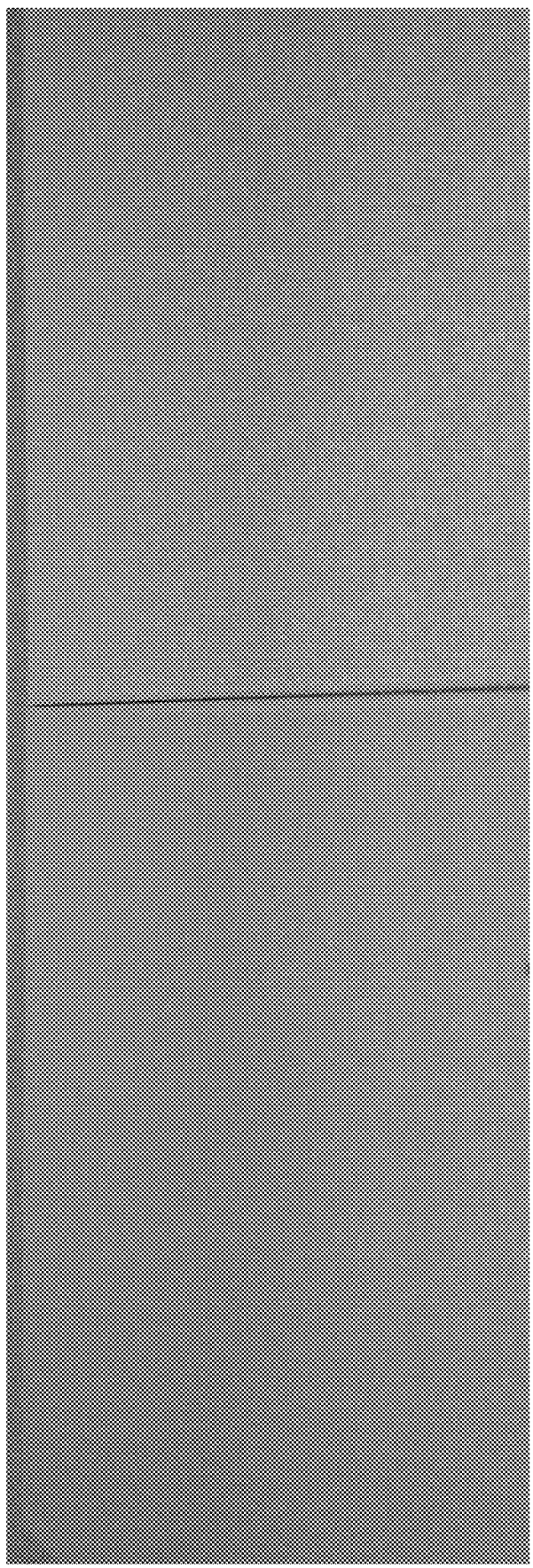
FIG. 3: Effect color approx. RAL 9007, glossy, inclination angle approx. 75°
Figure 4:
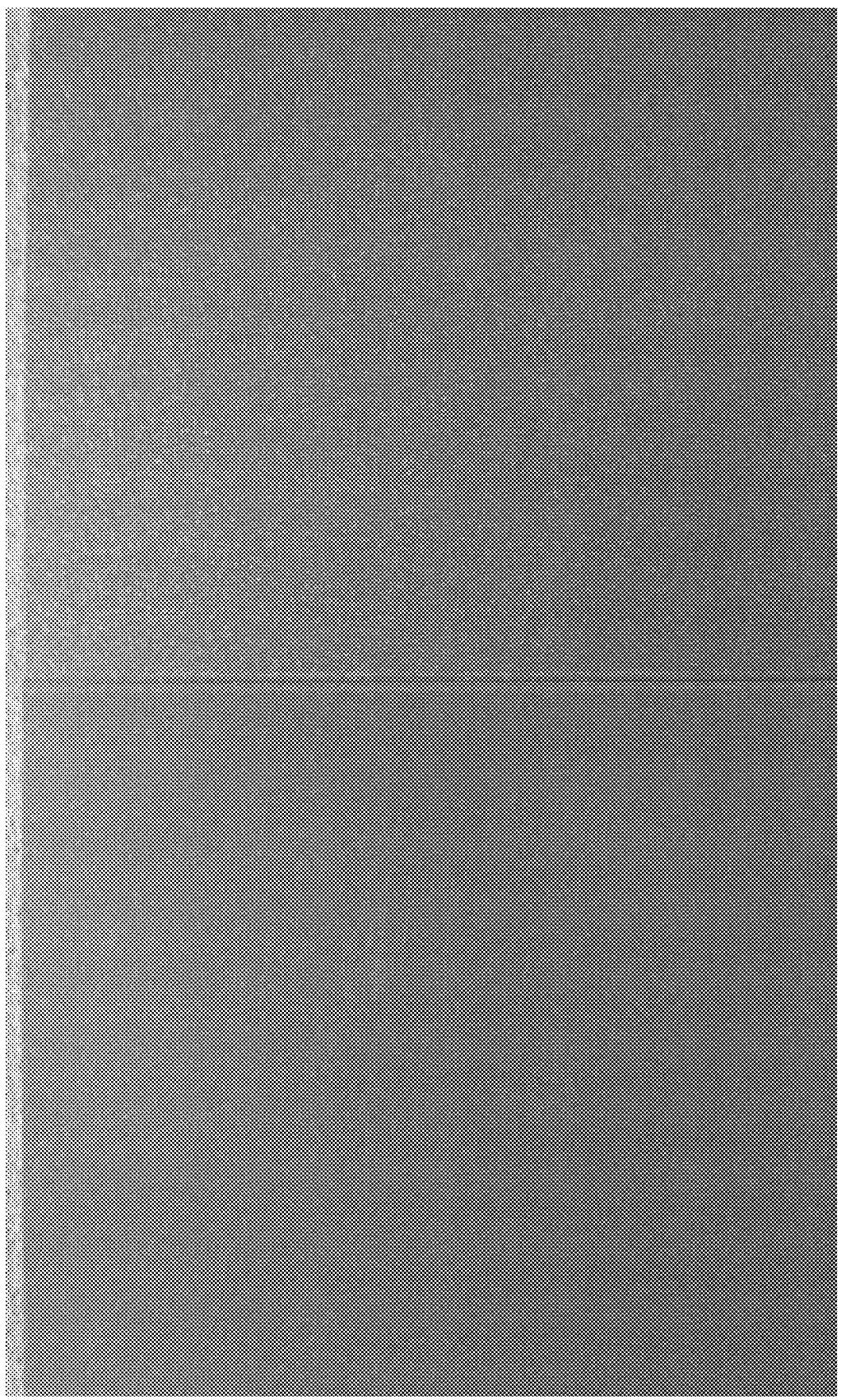
FIG. 4: gray matte metallic, inclination angle approx. 0°
Figure 5:
FIG. 5: gray matte metallic, inclination angle approx. 45°
Figure 6:
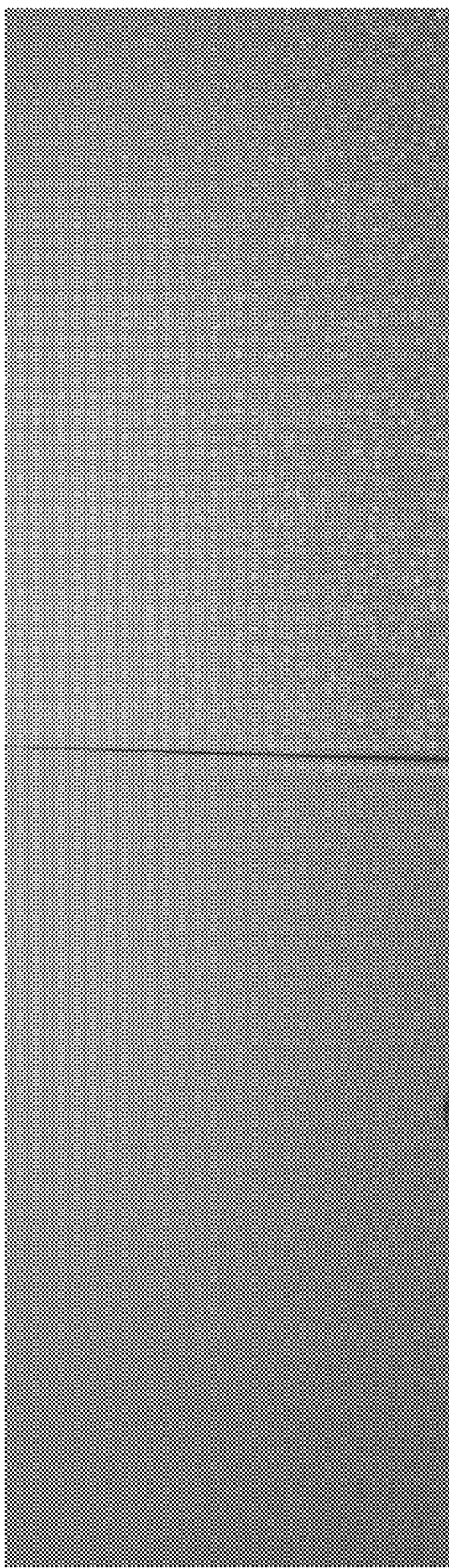
FIG. 6: gray matte metallic, inclination angle approx. 75°
Figure 7:
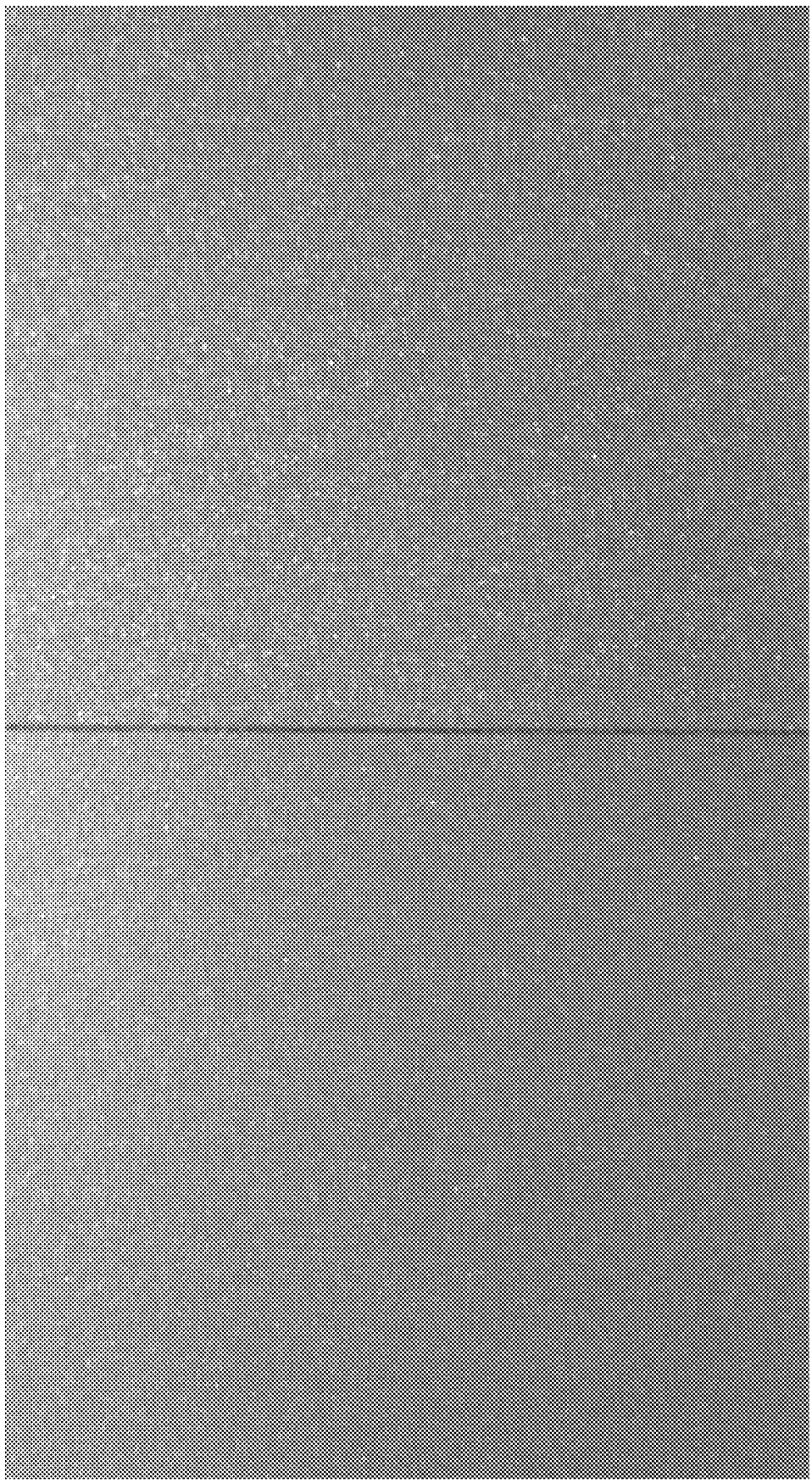
FIG. 7: dark gray matte metallic, inclination angle approx. 0°
Figure 8:
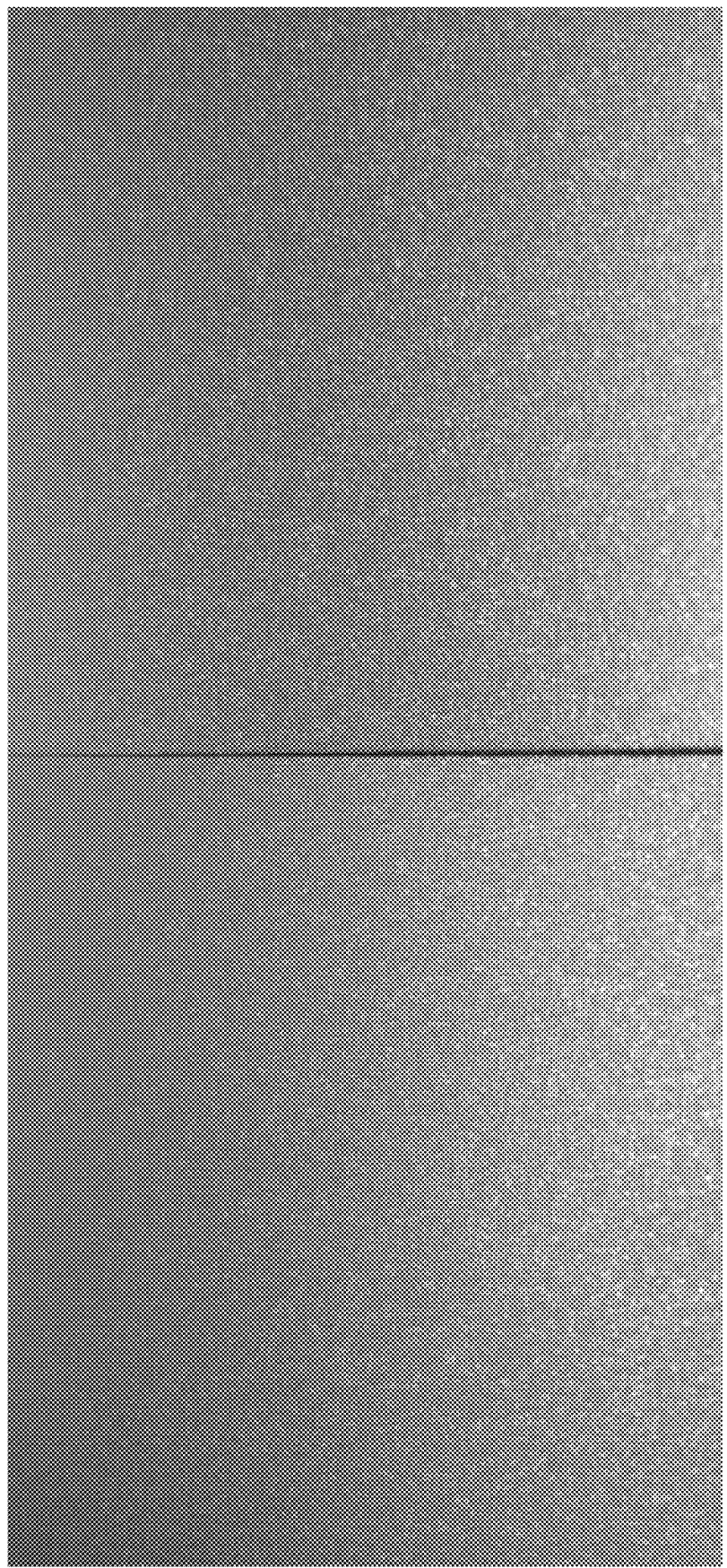
FIG. 8: dark gray matte metallic, inclination angle approx. 45°
Figure 9:
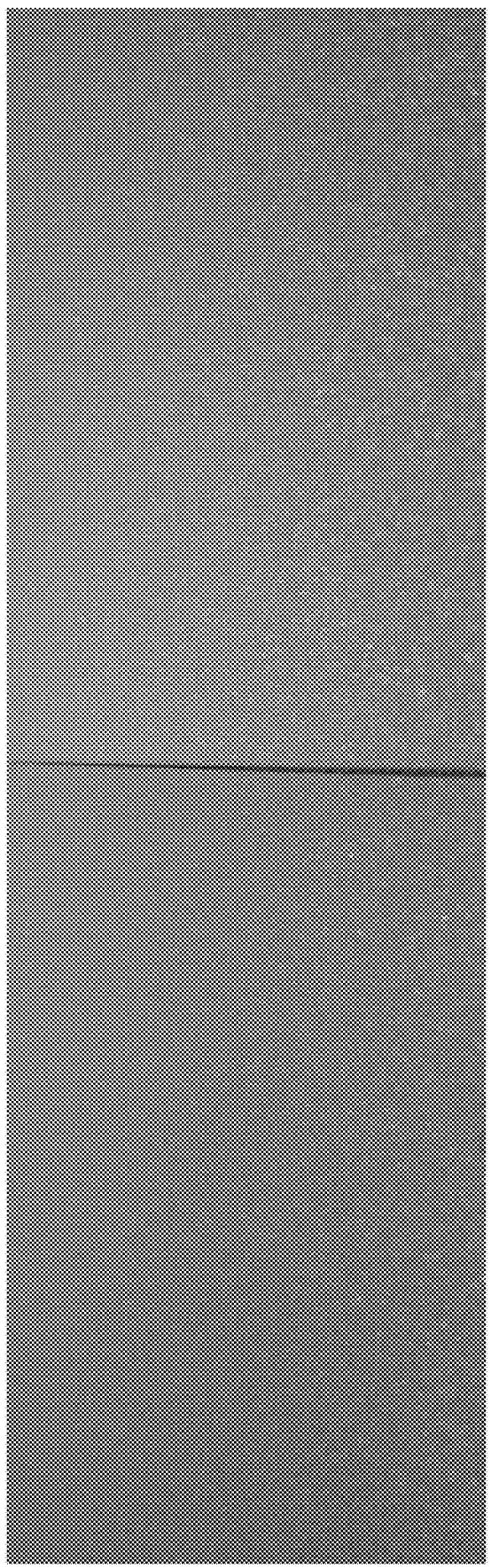
FIG. 9: dark gray matte metallic, inclination angle approx. 75°
Figure 10:
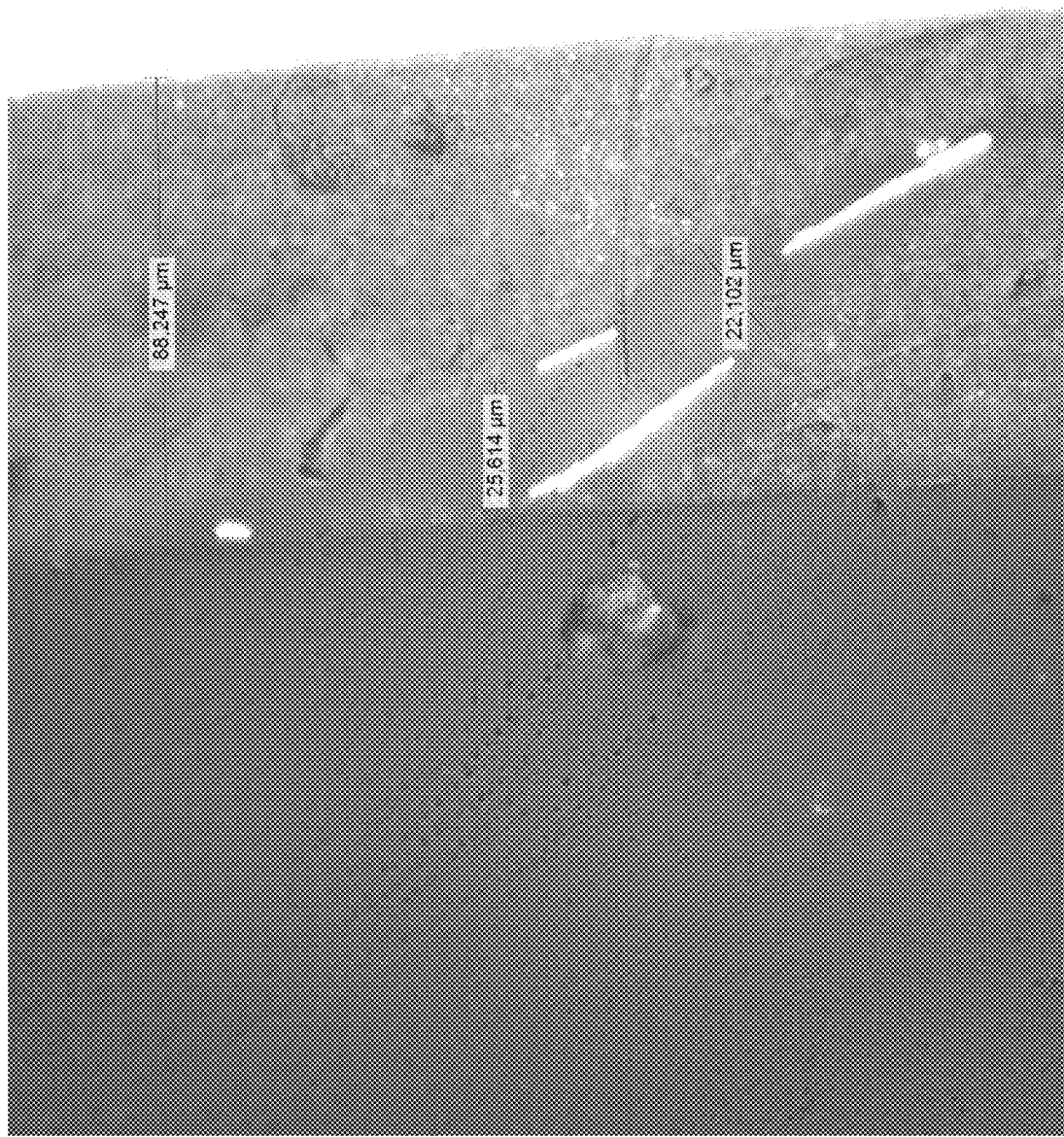
FIG. 10: Cross-section polish of a coating layer prepared with the powder coating according to the present invention; the pigment particles (light rods) are located in a channel of transparent, translucent powder coating, due to which the opaque, colored powder coating is visible. The substrate (light aluminum sheet) is visible to the right of the coating layer, while the dark embedding material of the compact can be seen on the left.
Figure 11:
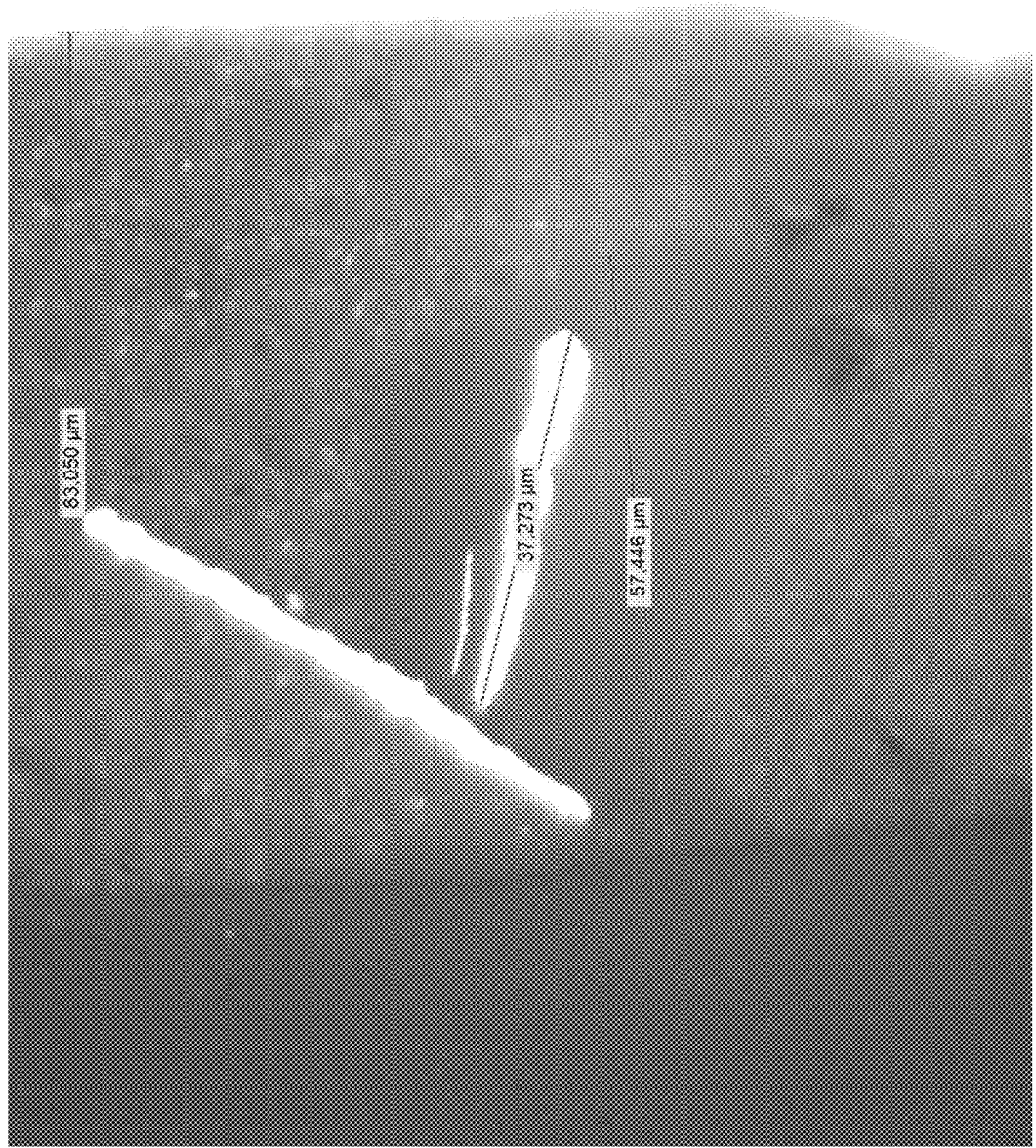
FIG. 11: The channel of transparent coating extends about 60 μm deep into the coating layer; the pigment embedded therein is thus visible when looking onto the surface.
Figure 12:
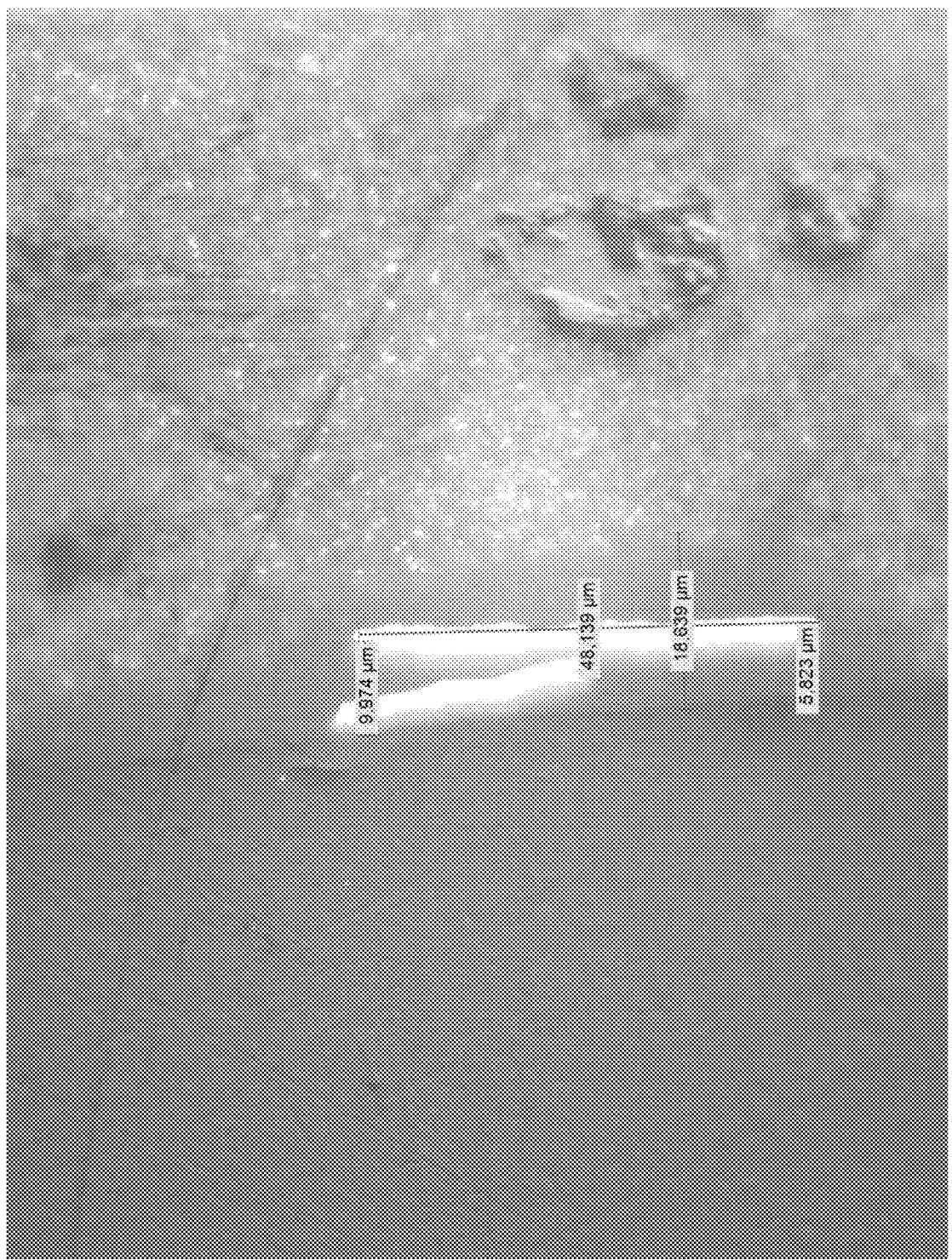
FIG. 12: The pigment is located about 10 μm below the surface, embedded in transparent powder coating and therefore visible.
Figure 13:
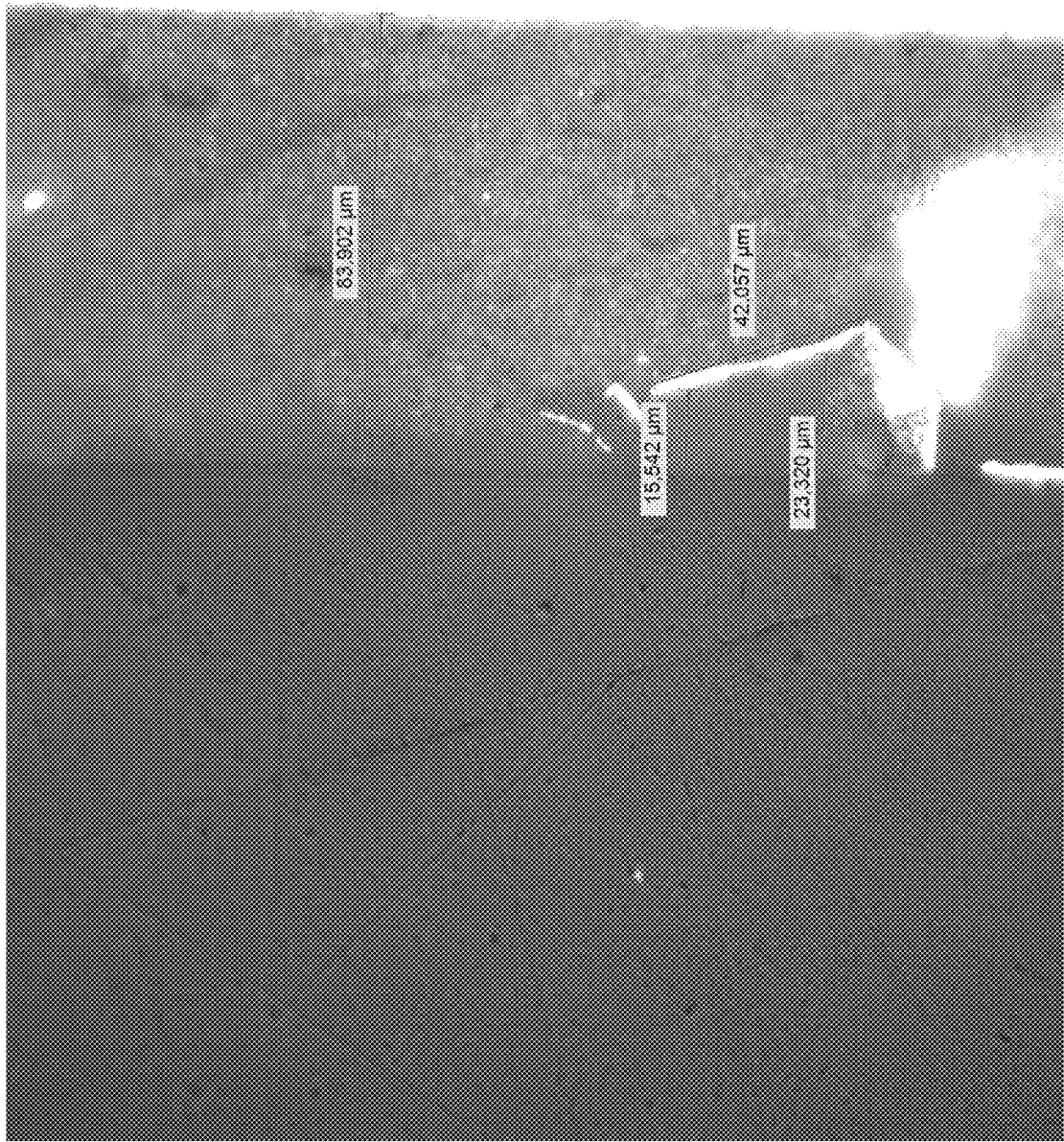
FIG. 13: The pigment is embedded up to 25 μm deep in the transparent coating. All around, the opaque, colored coating can be seen.
Figure 14:
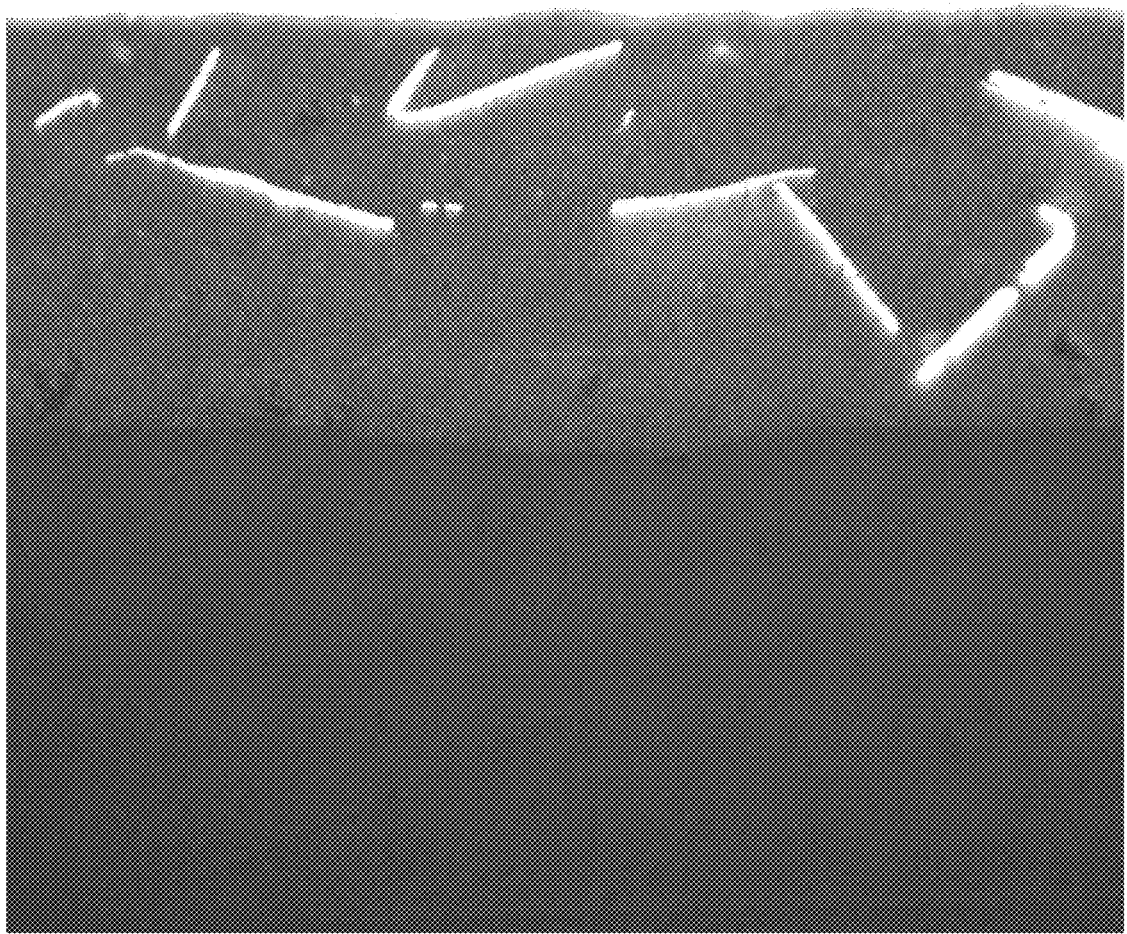
FIG. 14: Cross-section polish of a sample prepared with powder coating, wherein the pigment has been introduced into a colored, opaque coating during the extrusion process. The pigments are deeply embedded in the coating matrix and are NOT visible.
Figure 15:
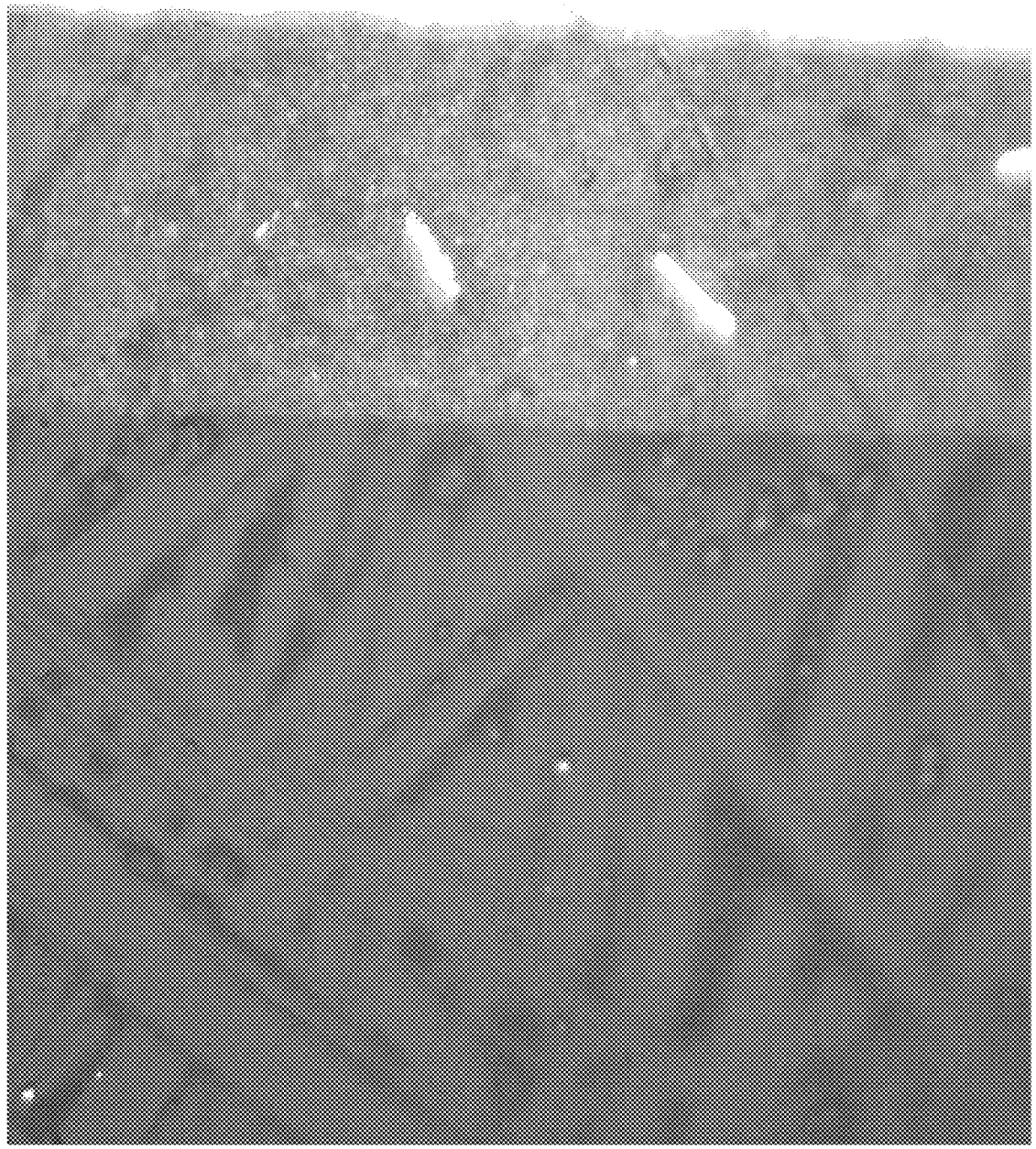
FIG. 15: Cross-section polish of a sample prepared with powder coating, wherein the pigment has been mixed into a colored opaque coating by means of bonding. The pigments are deeply embedded in the coating matrix and are NOT visible.
Figure 16:
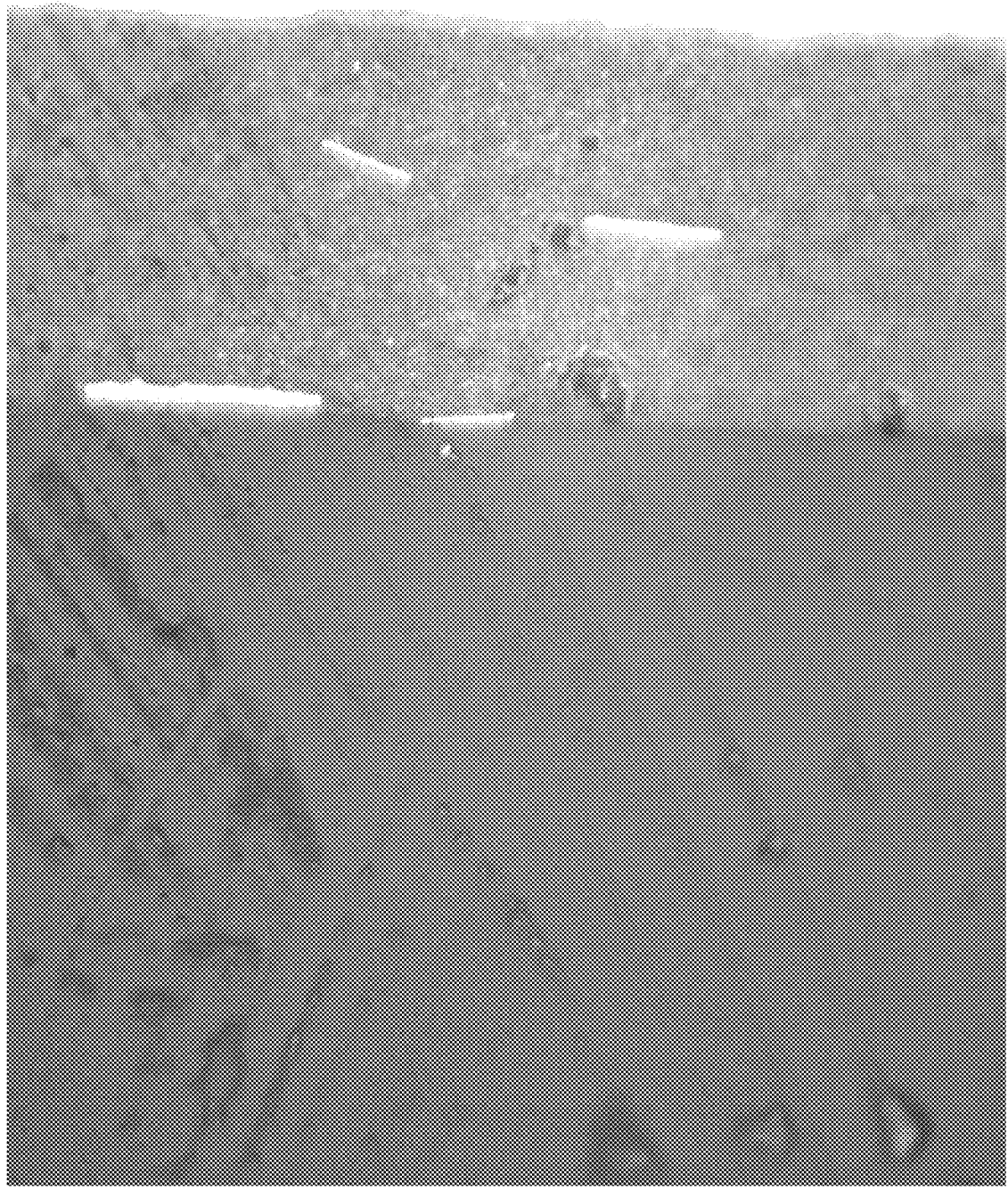
FIG. 16: Cross-section polish of a sample prepared with powder coating, wherein the pigment has been mixed into a colored opaque coating by means of bonding. A portion of the pigment particles is present at the surface and is visible (effect factor), while the remaining pigment particles are located in the coating matrix and are thus NOT visible.
Figure 20:
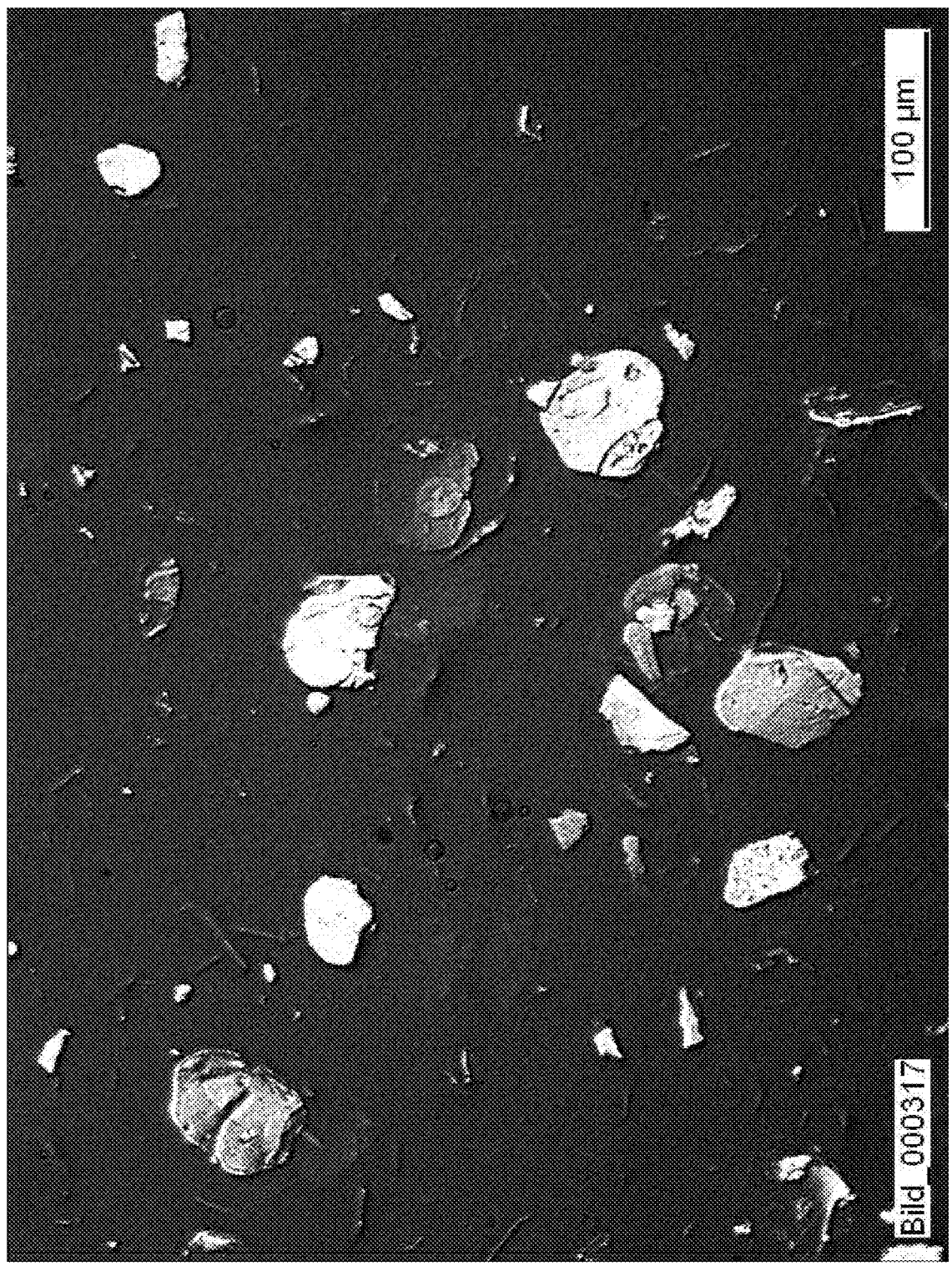
FIG. 20: Aluminum pigment, introduced during the extrusion process, addition via side feeder, screw configuration with mixing elements as shown in FIG. 17; pigment particles are only slightly sheared

FIG. 20 also shows an incident light microscope image of a cured powder coating film at 200× magnification, wherein the pigment has likewise been introduced into the powder coating by means of extrusion, but added via a side feeder. Screw configuration and mixing elements were arranged as shown in FIG. 1; it is clearly visible that the pigment is only slightly sheared.

Figure 21:
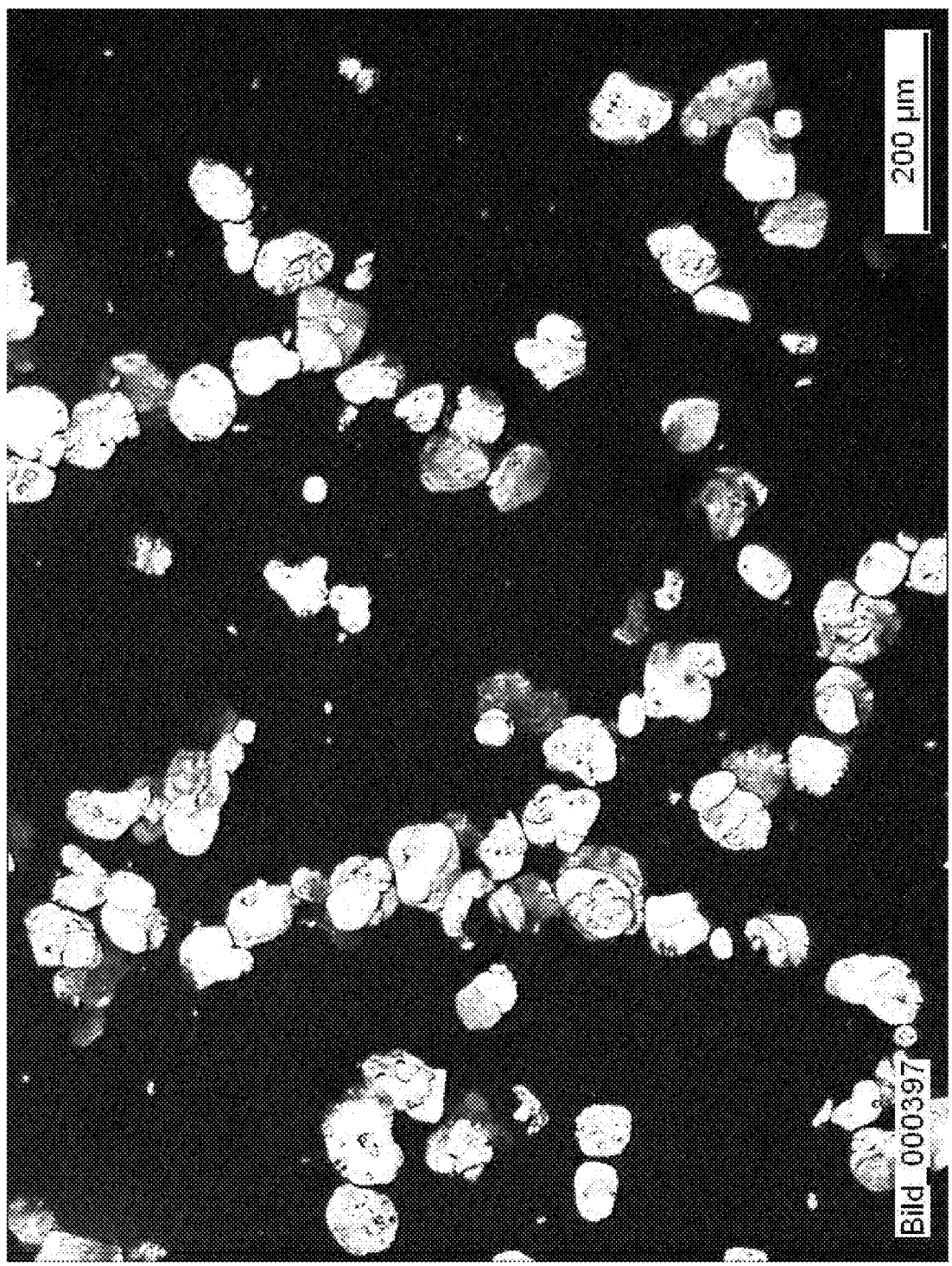
FIG. 21: Aluminum pigment, admixed according to the dry blending method

FIG. 21 also shows an incident light microscope image of a cured powder coating film at 200× magnification, wherein the aluminum pigment has been admixed by means of the dry blending method. It is also clearly visible that the pigment is only slightly sheared.

Figure 22:
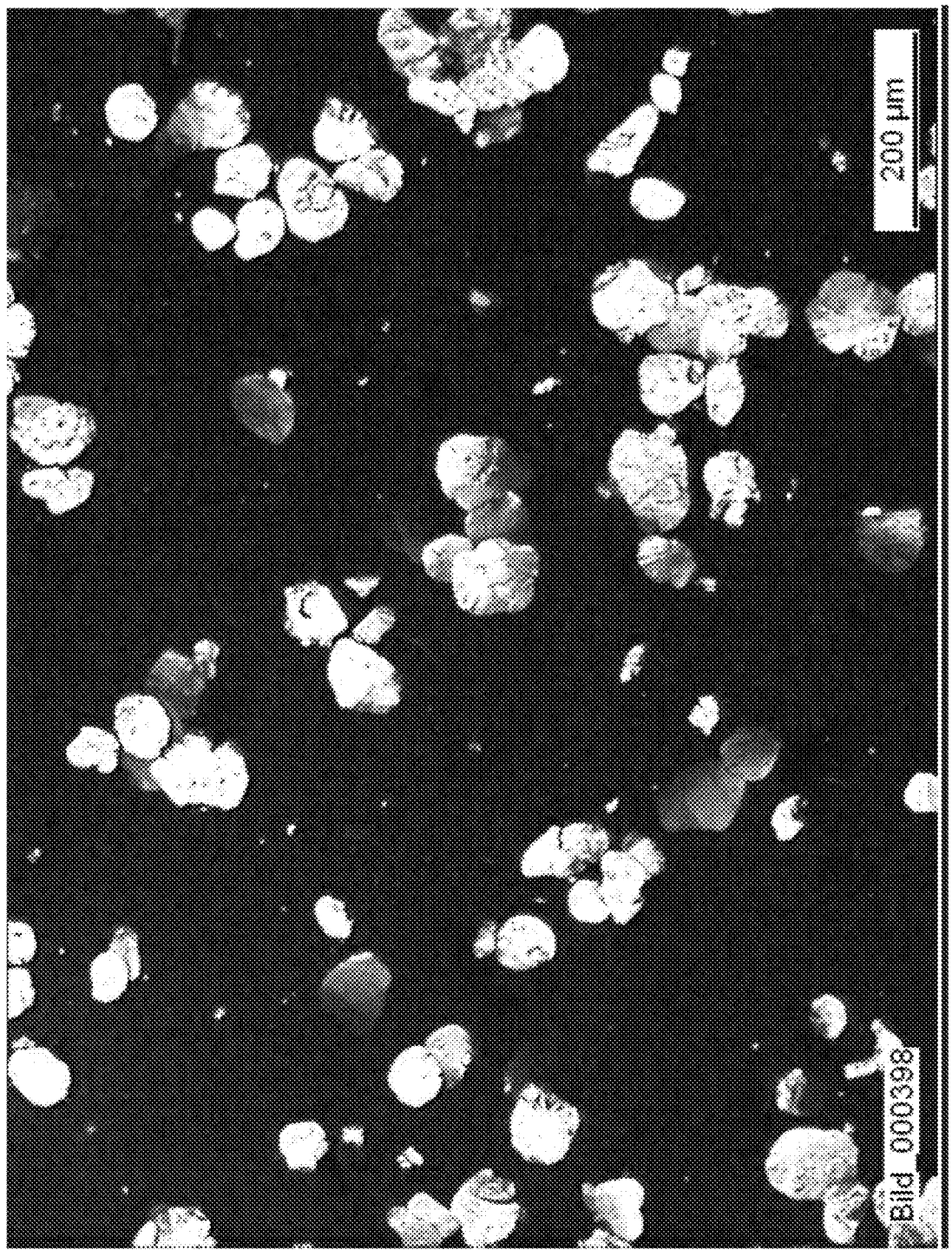
FIG. 22: Aluminum pigment, introduced during the extrusion process via side feeder, low shear force, side feeder arranged in the rear third of the extruder, screw configuration with conveying elements downstream from the side feeder inlet

FIG. 22 finally shows an incident light microscope image of a cured powder coating film at 200× magnification, wherein the aluminum pigment has been introduced during the extrusion process via a side feeder arranged in the rear third of the extruder; the screw configuration featured conveying elements downstream from the side feeder inlet. Again, it is clearly visible that the pigment is only slightly sheared.

Within the scope of the present invention it has been found that, by adding at least one pigment via at least one side feeder that is arranged at the end of the process section of the extruder, it is possible to reduce the shear forces to such an extent that the pigment is only insignificantly sheared and crushed. Experiments conducted with an aluminum silver dollar pigment (by Eckart, PCU 5000, D50 about 55 μm) show that the average diameter of the effect pigments is only slightly changed compared to the average diameter of the original pigment (admixed as a dry blend). In order to determine the extent of effect, several micrographs were taken and the particles were measured. For comparison and easier visual evaluation of the influence of shear forces on the final effect of the powder coating, tests were carried out on black, high-gloss powder coating. In these tests, the pigments were once more either incorporated at the beginning of the extrusion process or during the extrusion process by means of a side feeder, whereupon the melt was cooled, ground, applied on metal sheets in the form of a powder coating and finally baked. For comparison purposes, the result obtained was evaluated visually and also by means of incident light microscopy. In addition, tests with respect to the introduction into a transparent coating by means of extrusion were carried out, which, at least in part, led to the object of the present invention. Measurements with respect to particle size were conducted in the cold-rolled powder coating chip and, on the other hand, on a sample sheet coated with said ground coating.

Figure 25:
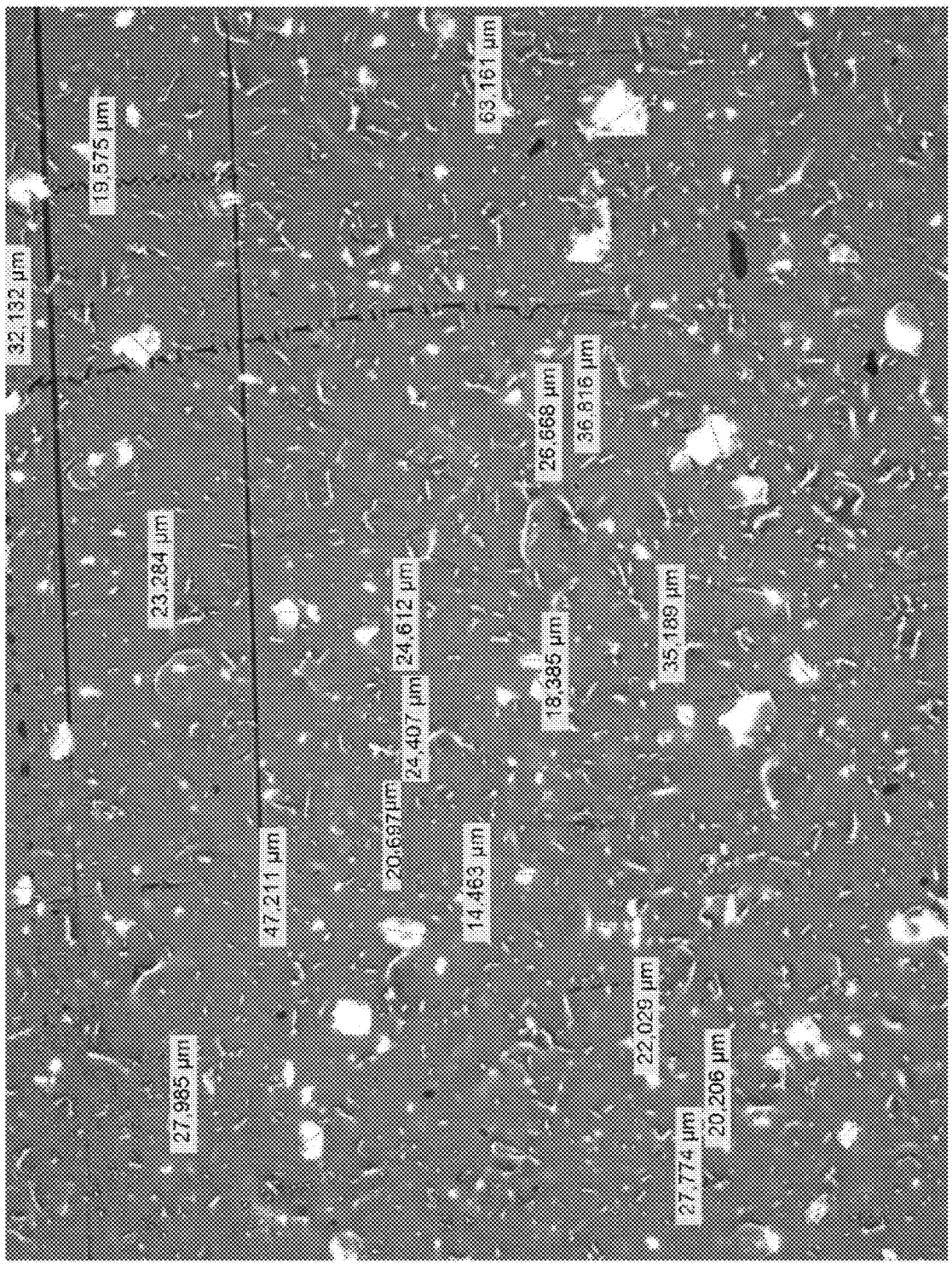
FIG. 25: Pigment introduced at the beginning of the extrusion process, 100× magnification, irregular shape of pigment particles, large number of small fragments

From FIG. 25 is also obvious that many of the pigments no longer have their original round shape and only fragments thereof are discernible. Microscopic evaluations have shown that—with addition at the inlet of the extruder, together with all other raw materials—the effect pigments or the fragments thereof only retain about 50% of their original diameter in the finished extrudate or in the cured coating. If the pigments were metered through the side feeder and subsequently exposed to low shear forces (cf. the screw configuration in FIG. 17), the average diameter was changed only insignificantly. The measurement results are documented in the following table:

| Pigment master batch in transparent, addition at extruder inlet, coating onto metal sheet | Pigment master batch, side feeder, coating onto metal sheet | Pigment in black HGL, addition at extruder inlet, coated metal sheet | | Pigment in black HGL, addition via side feeder, coated metal sheet | | Pigment, addition at extruder inlet, extrudate chip | | Pigment, addition via side feeder, extrudate chip | | Pigment dry blend in black HGL | |
|---|---|---|---|---|---|---|---|---|---|---|---|
| 26.52 | 56.3 | 32 | 60.6 | 59.3 | 57.9 | 59.6 | 68.4 | 24.75 | 26.92 | 56.3 | 93.25 | 58.6 | 84.6 |
| 18.12 | 64.69 | 23.28 | 18.5 | 35.8 | 89.4 | 55.97 | 72.1 | 28.96 | 25.75 | 32.47 | 62.2 | 75.6 | 60 |
| 18.62 | 52.74 | 19.57 | 22 | 30.8 | 63.7 | 74 | 59.6 | 13.3 | 19.8 | 65.44 | 29.56 | 49.15 | 63.1 |
| 29.11 | 72.48 | 27.9 | 23.7 | 15.5 | 69.19 | 66.5 | 64 | 16.78 | 13.271 | 52.15 | 59.59 | 43 | 33.1 |
| 7.8 | 52.74 | 47.2 | 16.8 | 23.3 | 58.7 | 44.68 | 54.65 | 18.12 | 16.58 | 34.12 | 52.17 | 62.2 | 53.3 |
| 17.4 | 63.85 | 20.69 | 24.4 | 35.87 | 59.9 | 70.1 | 52.14 | 17.59 | 24.22 | 38.39 | 78.2 | 60.6 | 56.8 |
| 14.48 | 62.22 | 14.46 | 27.2 | 23.32 | 54.03 | 46.17 | 59.12 | 27.4 | 25.9 | 58.43 | 63.4 | 69.3 | 35.7 |
| 20.11 | 63.85 | 24.6 | 16.2 | 23.32 | 58.9 | 93.9 | 32.65 | 18.21 | 49.35 | 78.133 | 57.87 | 42.8 | 34.1 |
| 39 | 51.35 | 24.1 | 15.57 | 30.17 | 58.4 | 44.9 | 43.92 | 25.35 | 38.2 | 60.54 | 58.58 | 54.35 | 64.2 |
| 15.65 | 47.77 | 18.38 | 26.57 | 76.9 | 40.25 | 88.5 | 40.9 | 21.95 | 23.15 | 59.04 | 59.63 | 57.1 | 76.2 |
| 11.66 | | 26.66 | 20.2 | 30.8 | 54.46 | 44.9 | 60.89 | 24.38 | 21.5 | 28.2 | 84.51 | 41.9 | 59.6 |
| 36.19 | | 63.16 | 60.3 | 10.9 | 50.7 | 35.5 | 47.86 | 29.49 | 23.15 | 5701 | | 56.9 | 67.27 |
| 35.385 | | 35.18 | 18.5 | 32.6 | 57.63 | 47.4 | 57.63 | 23.37 | 21.4 | | | 92.2 | 82.15 |
| 23.15 | | 22.02 | 24.2 | 19.1 | 48.15 | 60.5 | 27.5 | 33.04 | 22.1 | | | 19.7 | 44.6 |
| 13 | | | 20.2 | 32.3 | | 59.7 | 49.26 | | 37.9 | | | 54.5 | 66.26 |

-continued

| Pigment master batch in transparent, addition at extruder inlet, coating onto metal sheet | Pigment master batch, side feeder, coating onto metal sheet | Pigment in black HGL, addition at extruder inlet, coated metal sheet | Pigment in black HGL, addition via side feeder, coated metal sheet | Pigment, addition at extruder inlet, extrudate chip | Pigment, addition via side feeder, extrudate chip | Pigment dry blend in black HGL |
|---|---|---|---|---|---|---|
| 14.93 | | 27.7 | 31.2 | 56.72 66.1 | 20.94 | | 52.75 92.58 |
| 26.63 | | | 16 | 63.7 92.29 | | | 56.7 77.88 |
| 24.06 | | | | | | | 57 |
| 19.7 | | | | | | | 31 |
| Average 21.66 | 58.80 | 27.94 | 26.72 | 31.98 58.91 | 61.19 52.95 | 23.85 25.09 | 51.69 63.54 | 54.49 61.85 |

| Average of measurements | Measured particle diameter in μm |
|---|---|
| Fed into extruder at the beginning | 26.21 |
| Fed into extruder via side feeder | 57.85 |
| Admixture via dry blending | 58.17 |
| D50 pigment according to TDS | 55 |

Figure 23:
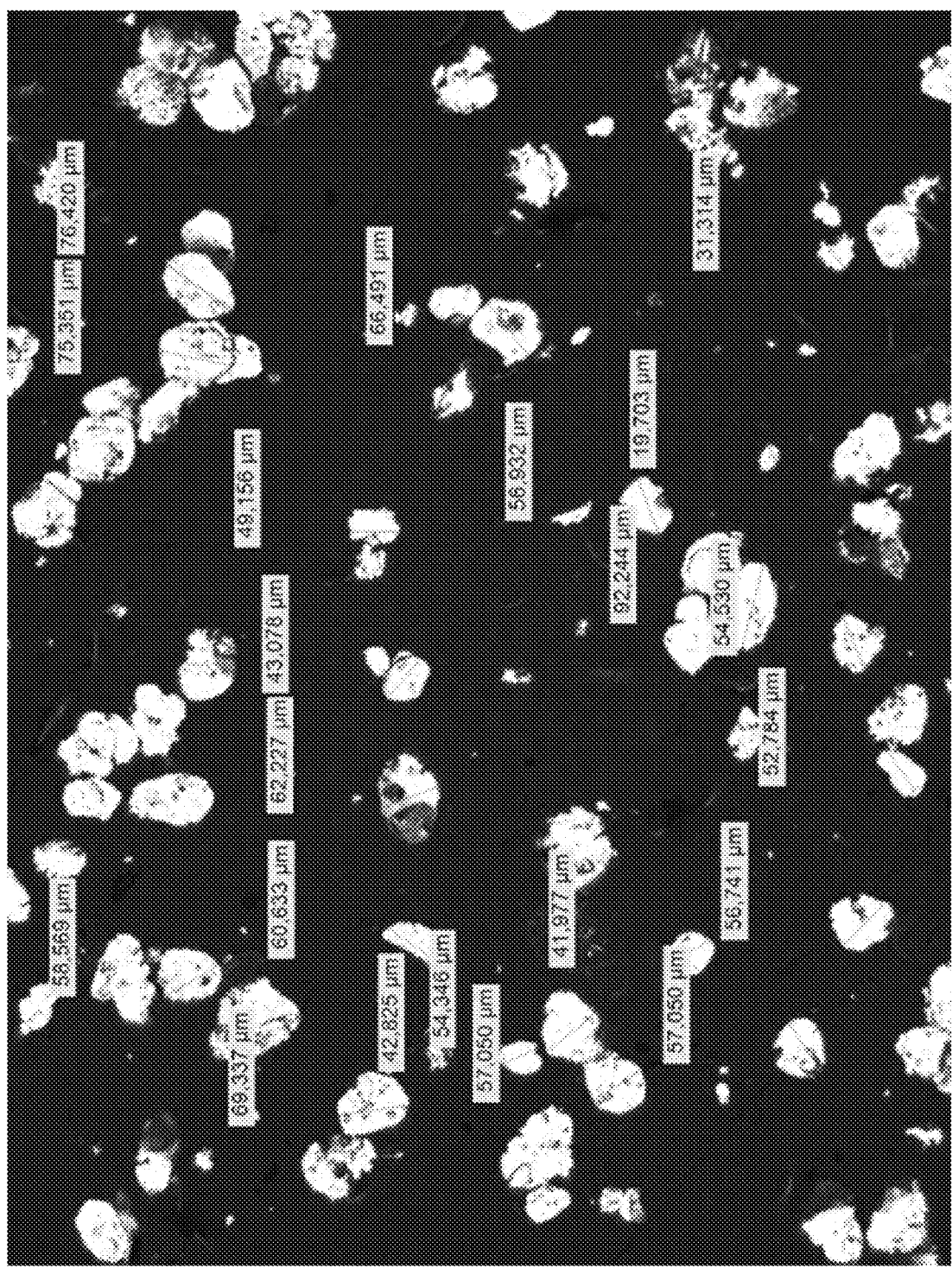
FIG. 23: For comparison with FIG. 22, pigment dry blend, admixed (NO shear forces), 100× magnification; pigment particle form round or oval, only few small pigment fragments
Figure 24:
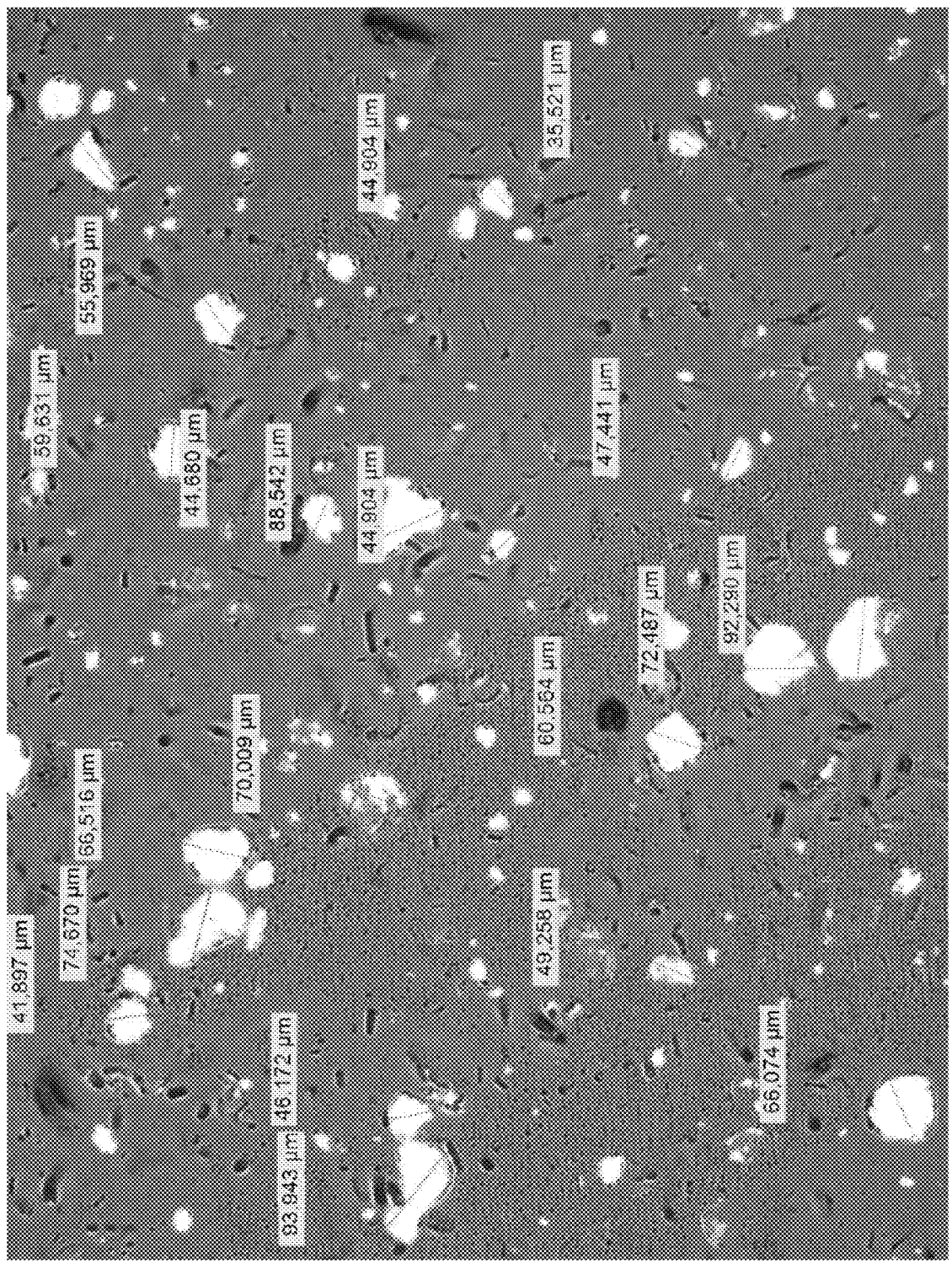
FIG. 24: Pigment incorporated during the extrusion process via side feeder, 100× magnification, large portion of the pigments still round/oval, only few fragments

Some recordings and measurements are shown in FIGS. 23 to 29. From these Figures it is also clearly evident that the pigment particles are significantly damaged when introduced at the beginning of the extrusion process. FIGS. 23 to 25 show metal sheets coated with the finished milled powder.

FIG. 23 shows a micrograph of a coating prepared with powder coating at 100× magnification, wherein the effect pigment has been admixed by means of dry blending (NO shear forces). The effect pigment particles have retained their original round or oval shape.

FIG. 24 shows a micrograph of a coating prepared with the powder coating according to the present invention at 100× magnification, wherein the effect pigment has been introduced into the transparent powder coating during the extrusion process via the side feeder; the majority of pigment particles is still round/oval, there are only few fragments.

FIG. 25 shows a micrograph of a coating prepared with a comparative powder coating in 100× magnification, wherein the effect pigment has been fed into the extruder at the beginning of the process and co-extruded. The particle shape is irregular and there are many small fragments.

The photographs of FIGS. 26 through 29 show powder coating chips which were evaluated immediately after leaving the extruder and the cooling roll (pressing into wafers, cooling and mechanical crushing).

Figure 26:
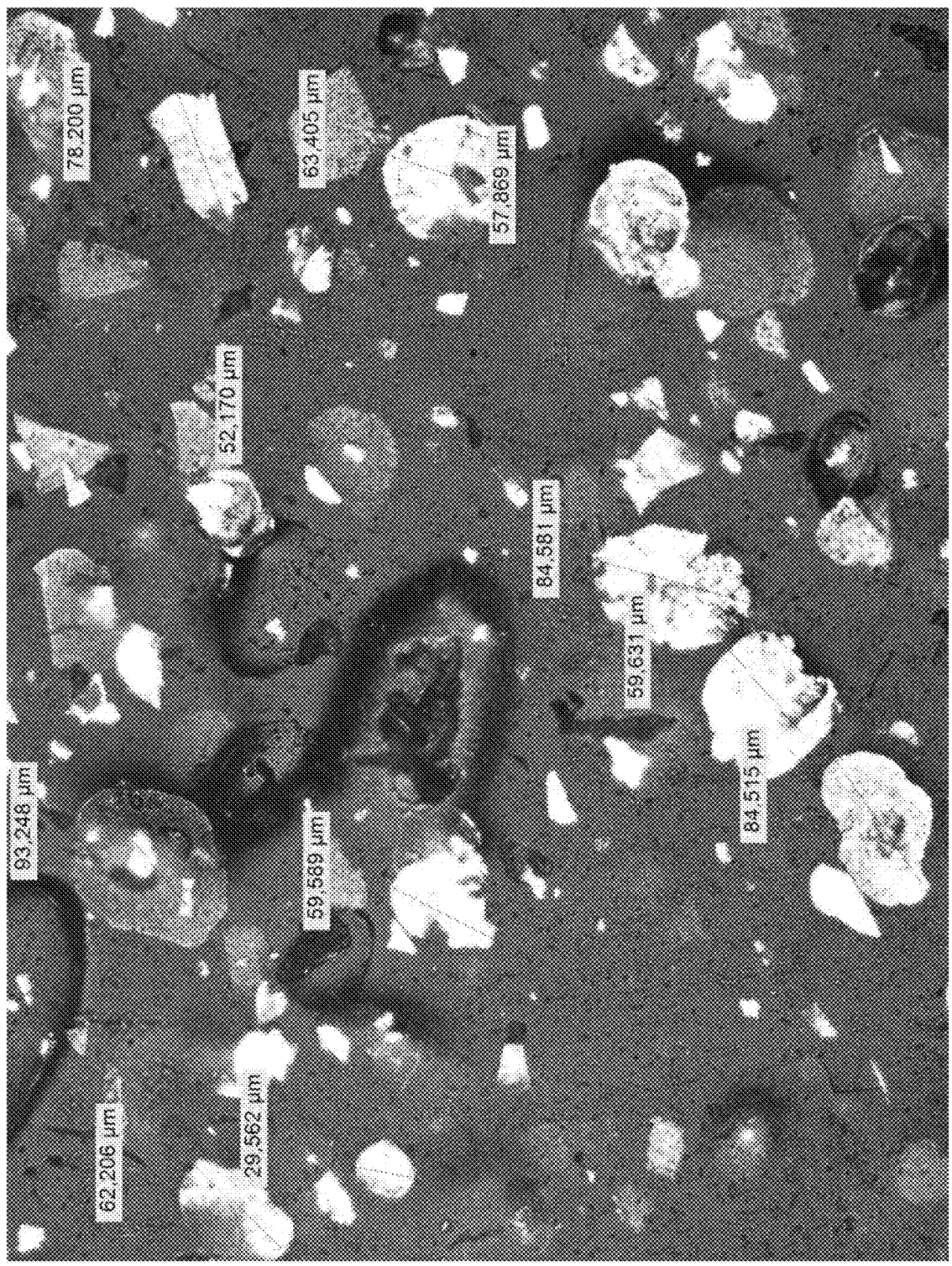
FIG. 26: Image of a powder coating chip, pigment introduced via side feeder, 200× magnification (powder coating chips which were evaluated immediately after leaving the extruder and cooling roll (pressing into wafers, cooling and mechanical crushing))

FIG. 26 shows a micrograph of a powder coating chip as used in the present invention at 200× magnification, wherein the effect pigment has been admixed by feeding into the extruder via side feeder.

Figure 27:
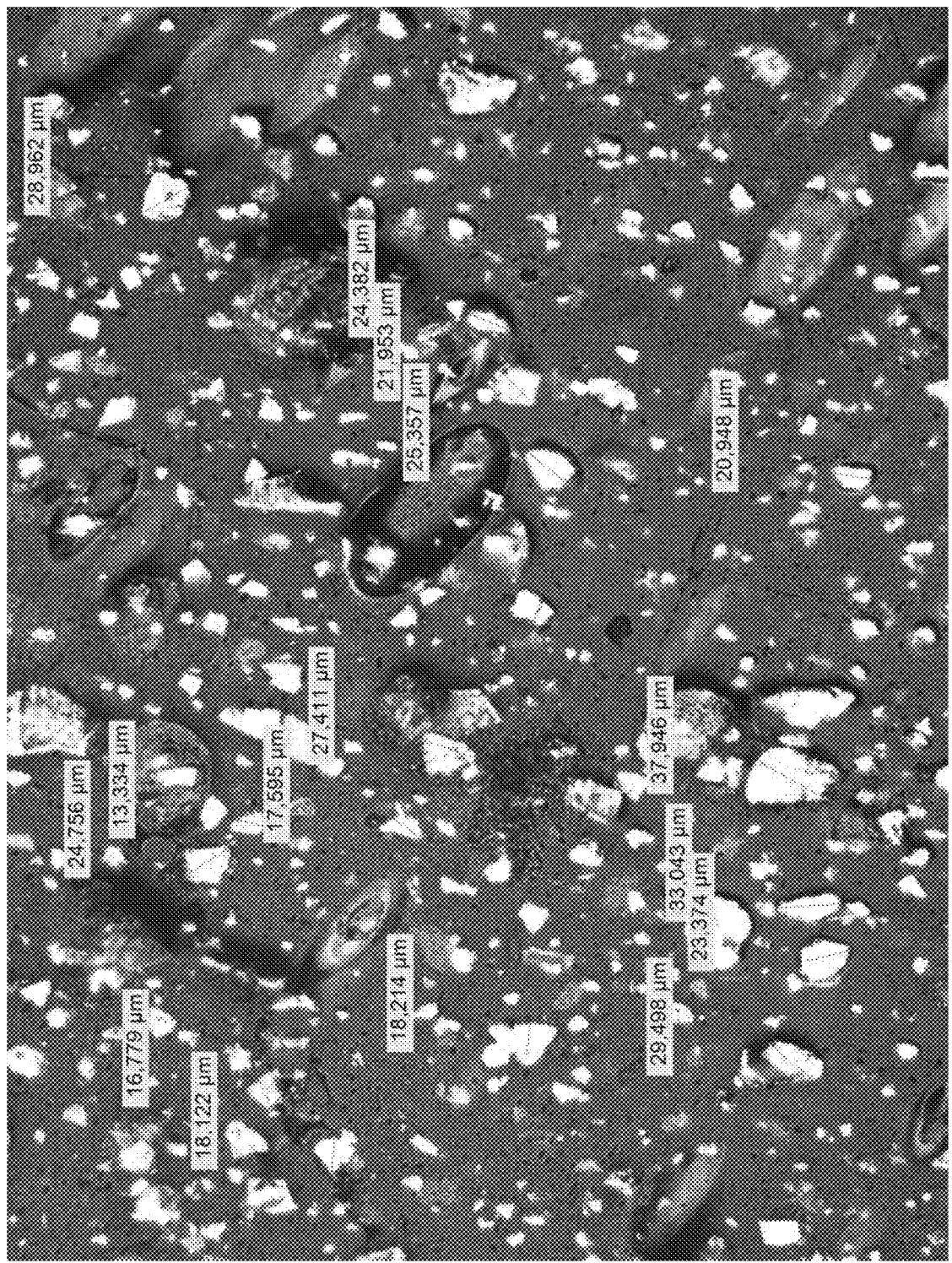
FIG. 27: Powder coating chip, pigment introduced at the beginning of the extrusion process, 200× magnification (powder coating chips which were evaluated immediately after leaving the extruder and cooling roll (pressing into wafers, cooling and mechanical crushing))

FIG. 27 shows, in comparison, a micrograph of a comparative powder coating chip at 200× magnification, wherein the effect pigment has been fed into the extruder at the beginning of the process and co-extruded.

Figure 28:
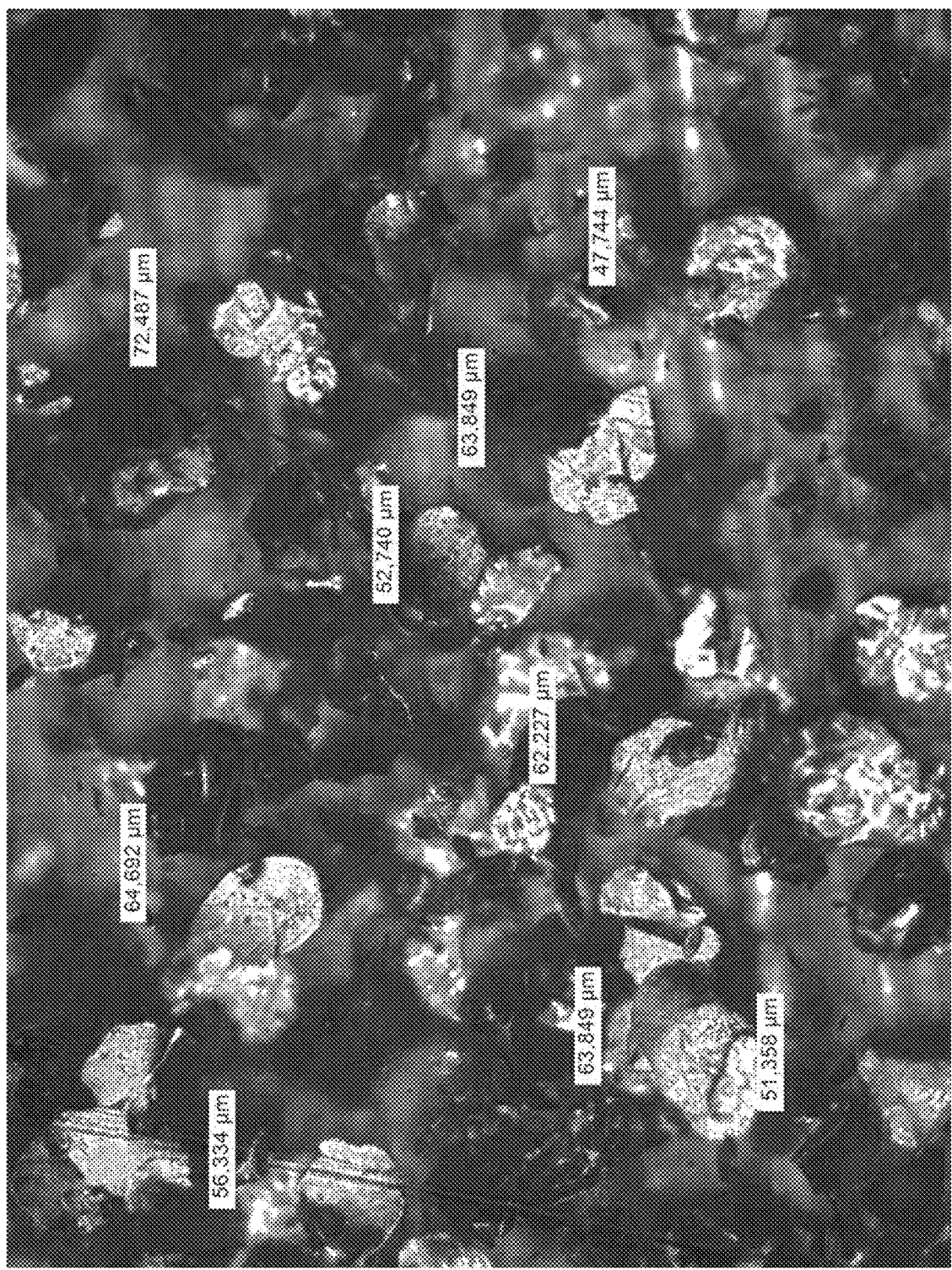
FIG. 28 Pigment master batch (pigment in colorless), addition via side feeder, 200× magnification (pigment extruded into transparent powder coating, ground, coated onto an aluminum sheet and baked)

FIG. 28 shows a micrograph of a master batch effect powder coating A (pigment in transparent powder coating) according to the present invention at 200× magnification, wherein the effect pigment has been admixed by feeding into the extruder via side feeder.

Figure 29:
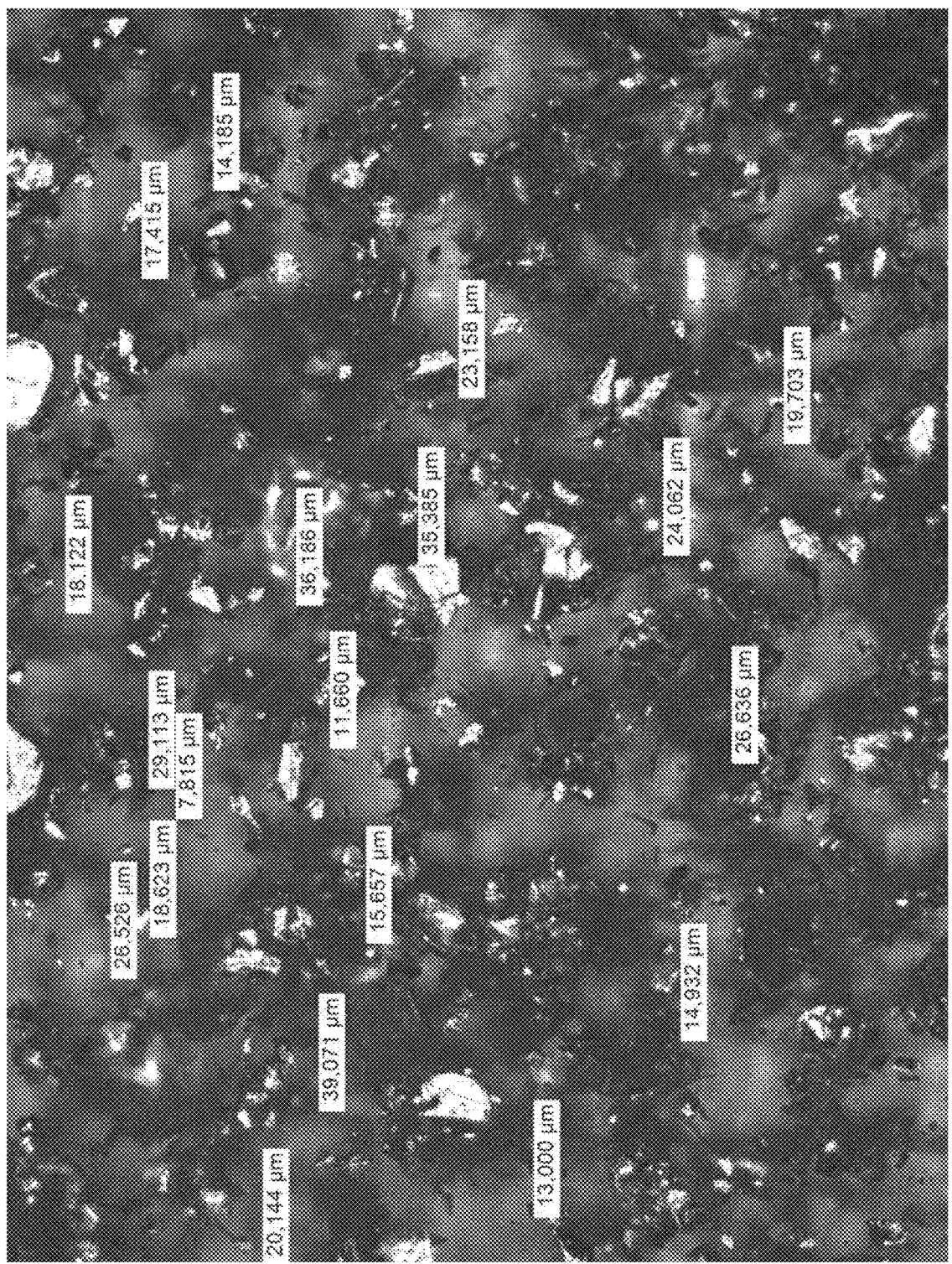
FIG. 29 Pigment master batch, addition at the beginning of the extrusion process, 200× magnification (pigment extruded into transparent powder coating, ground, coated onto an aluminum sheet and baked)

FIG. 29 shows, in comparison, a micrograph of a comparative master batch (pigment in transparent powder coating) at 200× magnification, wherein the effect pigment has been fed into the extruder at the beginning of the process and co-extruded.

Examples

TABLE 1

SI (sparkle intensity) values obtained at various measurement angles

| | SI value | | |
|---|---|---|---|
| Measurement angle (between light source and measuring sensor) | 15° | 45° | 75° |
| RAL 9007, glossy, bonded, TIGER product No. 029/76018 | 24.22 | 3.29 | 2.54 |
| RAL 9007, glossy, according to the present invention | 47.42 | 30.14 | 29.08 |
| Dark gray metallic, fine structure, bonded, TIGER product No. 029/80848 | 36.12 | 11.35 | 10.13 |
| Dark gray metallic, fine structure, according to the present invention | 25.51 | 31.28 | 31.57 |
| Gray metallic matte, bonded, TIGER product No. 068/71558 | 27.34 | 10.15 | 2.89 |
| Gray metallic matte, according to the present invention | 54.05 | 53.31 | 36.15 |

The invention claimed is:

1. A powder coating, comprising at least one opaque basic powder coating B and at least one ground effect powder coating A comprising effect pigments, wherein the effect pigments comprised in the effect powder coating A are, at least partially, coated with a transparently curing powder coating matrix.

2. The powder coating of claim 1, wherein the powder coating comprises the effect powder coating A in admixture with the opaque basic powder coating B in a mass ratio of 1 to 50% of effect powder coating and 50 to 99% of opaque basic powder coating.

3. The powder coating of claim 1, wherein the effect pigments are metallic-effect pigments.

4. The powder coating of claim 1, wherein the effect pigments are pearlescent and/or interference pigments.

5. The powder coating of claim 1, wherein the average diameter of the effect pigment particles dispersed in the powder coating amounts to at least 80% of the average diameter of the original effect pigment particles.

6. The powder coating of claim 1, wherein the average diameter of the effect pigment particles dispersed in the powder coating amounts to at least 90% of the average diameter of the original effect pigment particles.

7. A method for preparing a powder coating of claim 1, the method comprising blending the at least one opaque basic powder coating B and the at least one ground effect powder coating A, wherein the effect powder coating A is produced by a method comprising:
    melting a transparent powder coating to produce a transparently curing powder coating melt;
    stirring at least one effect pigment into the transparently curing powder coating melt, cooling the transparently curing powder coating melt; and
    grinding the cooled melt to produce the effect powder coating A.

8. The method for preparing a powder coating of claim 7, wherein at least one effect pigment is added to the transparently curing powder coating melt during an extrusion process via at least one side feeder.

9. An effect powder coating, wherein the pigment particles contained in the coating are, at least partially, coated with a transparent matrix and at least one channel formed from said transparent matrix extends from at least one effect pigment particle to the surface of the coating, wherein said channel has a depth of at least 5 µm.

10. The effect powder coating of claim 9, wherein the channel has a depth of at least 10 µm.

11. The effect powder coating of claim 10, wherein the channel has a depth of at least 20 µm.

* * * * *